(12) United States Patent
Sakamoto et al.

(10) Patent No.: US 12,019,332 B2
(45) Date of Patent: Jun. 25, 2024

(54) BARRIER FILM, AND WAVELENGTH CONVERSION SHEET, BACKLIGHT, AND LIQUID CRYSTAL DISPLAY DEVICE IN WHICH SAME IS USED, AS WELL AS METHOD FOR SELECTING BARRIER FILM

(71) Applicant: DAI NIPPON PRINTING CO., LTD., Tokyo (JP)

(72) Inventors: Takeshi Sakamoto, Fujimino (JP); Ryutaro Harada, Tokyo (JP); Shuichi Tamura, Misato (JP); Akihito Haruki, Saitama (JP); Shota Yamanishi, Nagareyama (JP); Yuko Fujioka, Matsudo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 18/041,652

(22) PCT Filed: Aug. 3, 2021

(86) PCT No.: PCT/JP2021/028684
§ 371 (c)(1),
(2) Date: Feb. 14, 2023

(87) PCT Pub. No.: WO2022/039014
PCT Pub. Date: Feb. 24, 2022

(65) Prior Publication Data
US 2023/0305336 A1    Sep. 28, 2023

(30) Foreign Application Priority Data

Aug. 19, 2020  (JP) .................. 2020-138762

(51) Int. Cl.
*G02F 1/1335* (2006.01)

(52) U.S. Cl.
CPC .... *G02F 1/133614* (2021.01); *G02F 2202/36* (2013.01)

(58) Field of Classification Search
CPC ................... G02F 1/133614; G02F 2202/36
See application file for complete search history.

(56) References Cited

U.S. PATENT DOCUMENTS 9,470,399 B1 * 10/2016 Skipor ............. G02F 1/133617
10,585,226 B2    3/2020 Cho et al.
(Continued)

FOREIGN PATENT DOCUMENTS

| CN | 105531620 | 4/2016 |
| CN | 105793034 | 7/2016 |

(Continued)

OTHER PUBLICATIONS

Written Opinion of PCT/JP2021/028684, dated Oct. 19, 2021, 8 pages including English translation.

(Continued)

*Primary Examiner* — Joseph L Williams
(74) *Attorney, Agent, or Firm* — HSML P.C.

(57) ABSTRACT

Provided is a barrier film that can suppress a change in color when applied to a wavelength conversion sheet. A barrier film for a wavelength conversion sheet that is a barrier film comprising at least one inorganic oxide layer and at least one organic coating layer on one surface of a light-transmitting base material, wherein a value of a water vapor transmission rate according to JIS K7129-2:2019 is 0.20 g/m²·day or less, and when a spectral transmittance of the barrier film is measured with a surface of a side comprising the inorganic oxide layer and the organic coating layer as a light coming-in surface, the barrier film comprises a spectral transmittance bottom at which the spectral transmittance changes from decreasing to increasing, or a spectral transmittance peak at (Continued)

which the spectral transmittance changes from increasing to decreasing, in the range of 450 nm±7 nm.

11 Claims, 6 Drawing Sheets

(56) References Cited

U.S. PATENT DOCUMENTS

| | | |
|---|---|---|
| 2016/0161657 A1 | 6/2016 | Yamada et al. |
| 2016/0327690 A1 | 11/2016 | Tokinoya et al. |
| 2017/0192146 A1 | 7/2017 | Yamada et al. |
| 2019/0039349 A1 | 2/2019 | Shoda et al. |
| 2021/0189230 A1 | 6/2021 | Iida et al. |

FOREIGN PATENT DOCUMENTS

| | | |
|---|---|---|
| CN | 106711345 | 5/2017 |
| CN | 109070539 | 12/2018 |
| JP | 2005-096108 | 4/2005 |
| JP | 2005-250091 | 9/2005 |
| JP | 2007-290369 | 11/2007 |
| JP | 2015-018131 | 1/2015 |
| JP | 2016-62804 | 4/2016 |
| JP | 2016-71341 | 5/2016 |
| JP | 2017-142360 | 8/2017 |
| JP | 2018-124412 | 8/2018 |
| JP | 2019-126924 | 8/2019 |
| JP | 2020-019141 | 2/2020 |
| WO | 2012/132239 | 10/2012 |
| WO | 2014/061408 | 4/2014 |
| WO | 2016/051760 | 4/2016 |
| WO | 2016/104401 | 6/2016 |
| WO | 2019/078135 | 4/2019 |

OTHER PUBLICATIONS

Office Action issued for Japanese Patent Application No. 2020-181324 dated Feb. 16, 2021, 6 pages including machine translation.
Office Action issued for Japanese Patent Application No. 2020-181324 dated Aug. 31, 2021, 3 pages including machine translation.
Office Action issued for Japanese Patent Application No. 2020-181324 dated Oct. 26, 2021, 6 pages including machine translation.
Office Action issued for Japanese Patent Application No. 2020-181324 dated Mar. 8, 2022, 8 pages including machine translation.
International Search Report of PCT/JP2021/028684, dated Oct. 19, 2021, 5 pages including English translation.
Office Action issued for Chinese Patent Application No. 202180069616.2, dated Nov. 16, 2023, 23 pages with English translation.

\* cited by examiner

[Fig. 1]
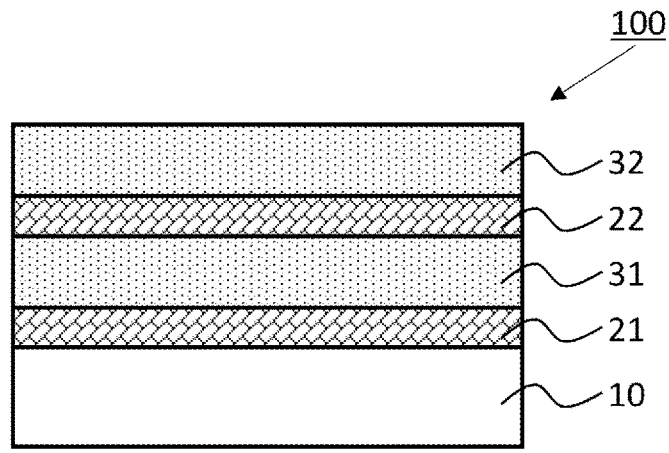
[Fig. 2]
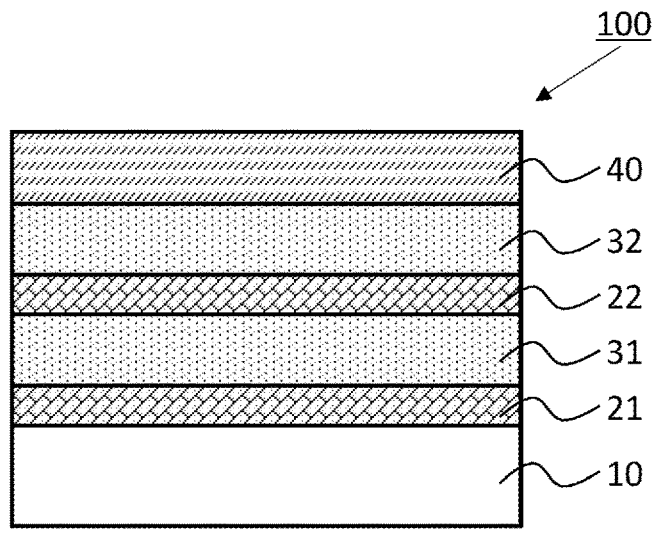
[Fig. 3]
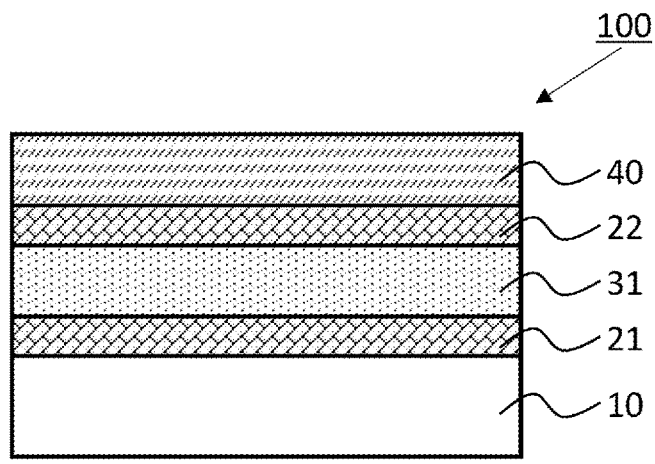

[Fig. 4]
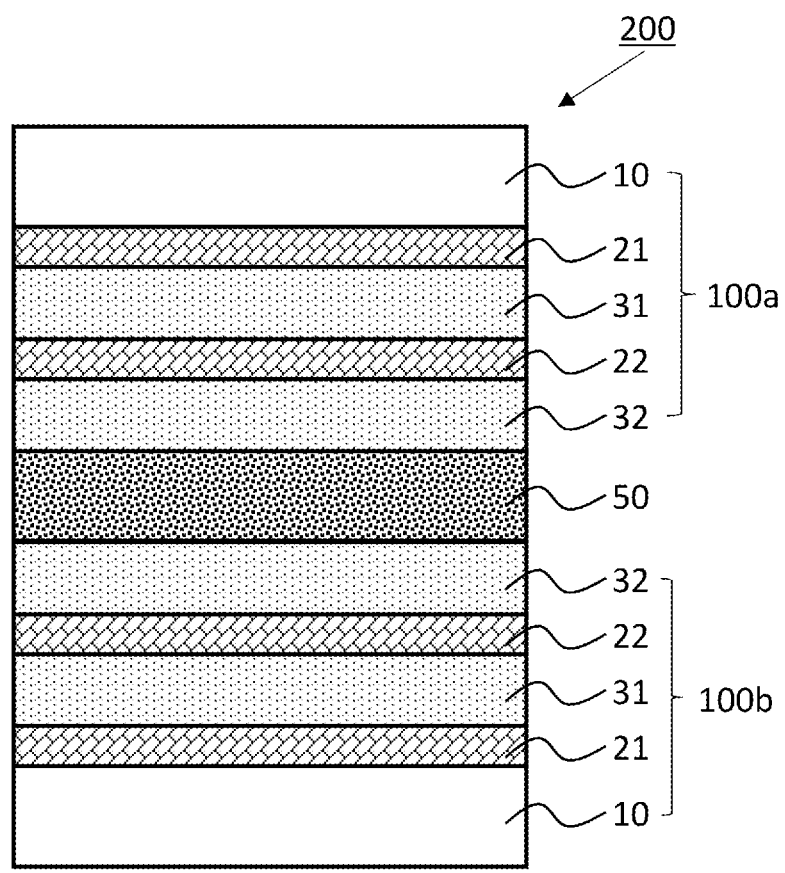

[Fig. 5]
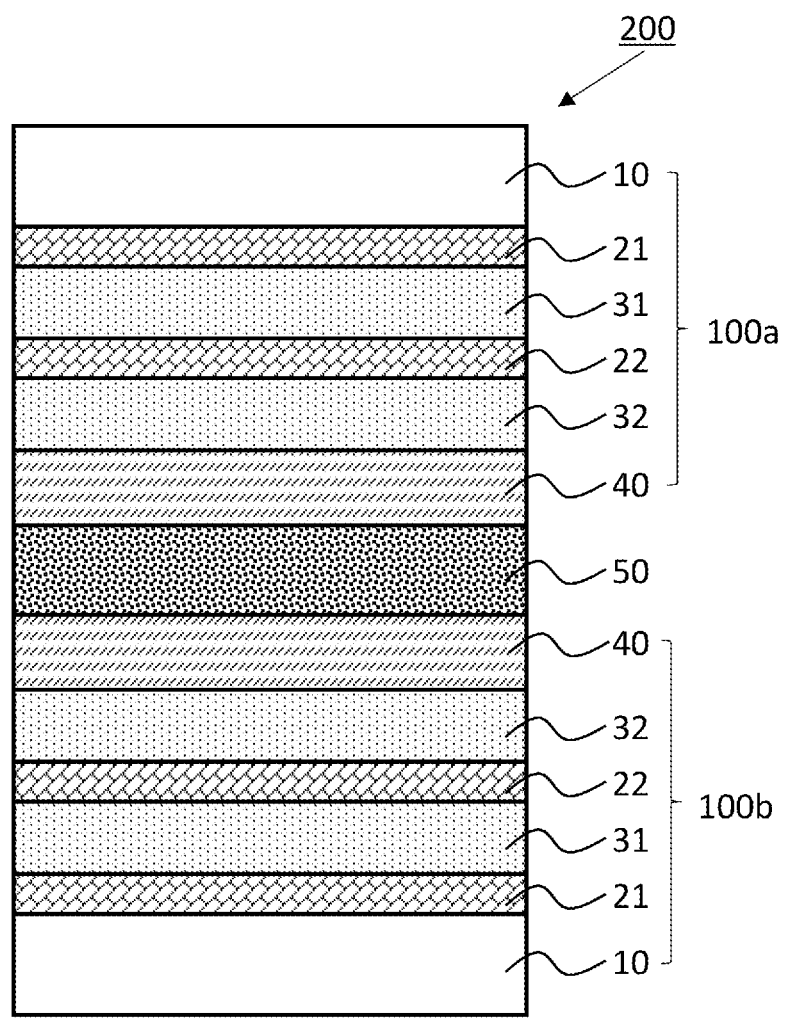

[Fig. 6]
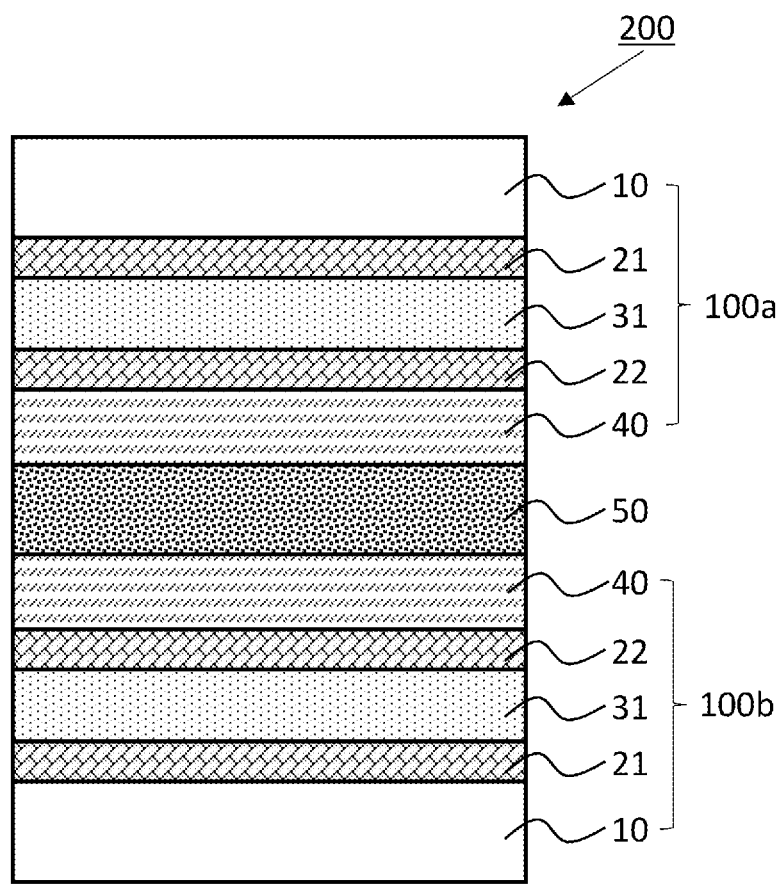

[Fig. 7]
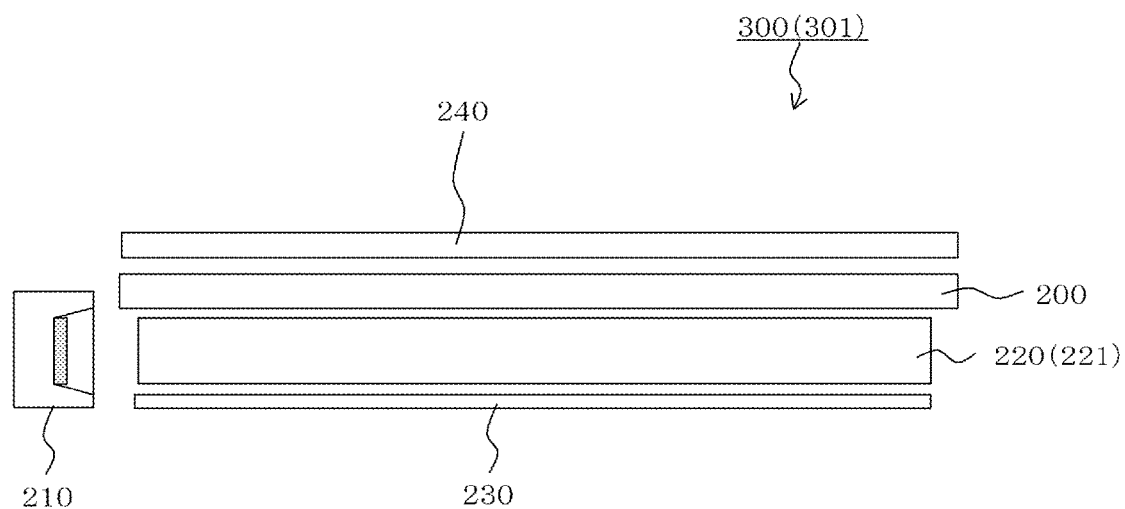
[Fig. 8]
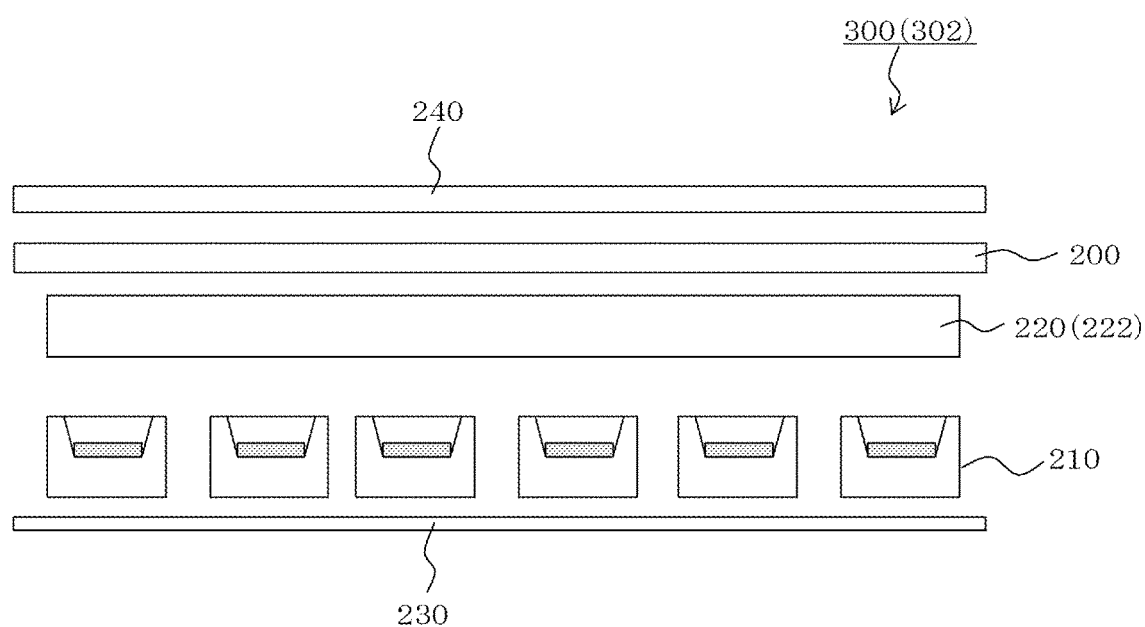

[Fig. 9]
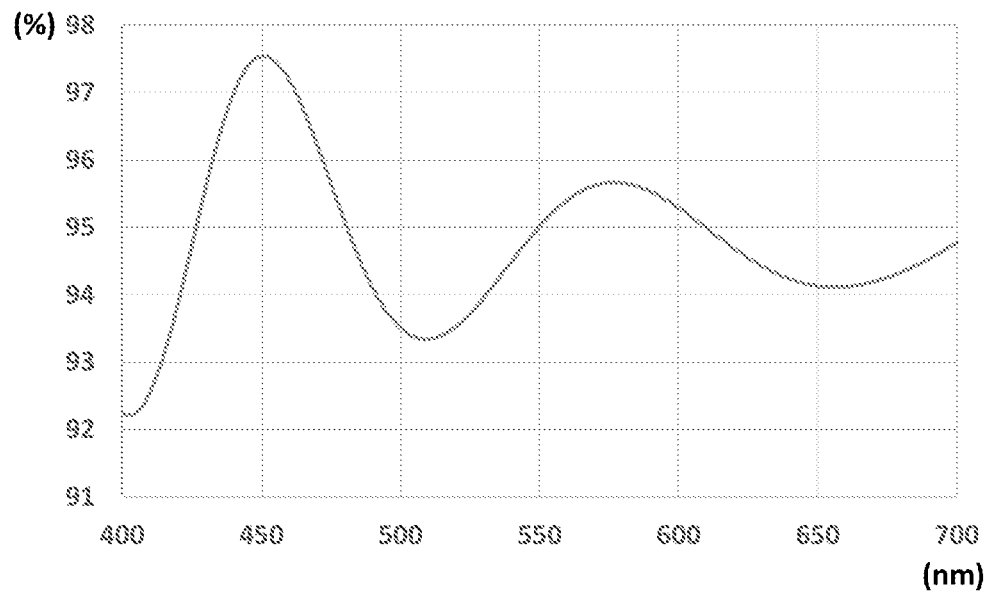
[Fig. 10]
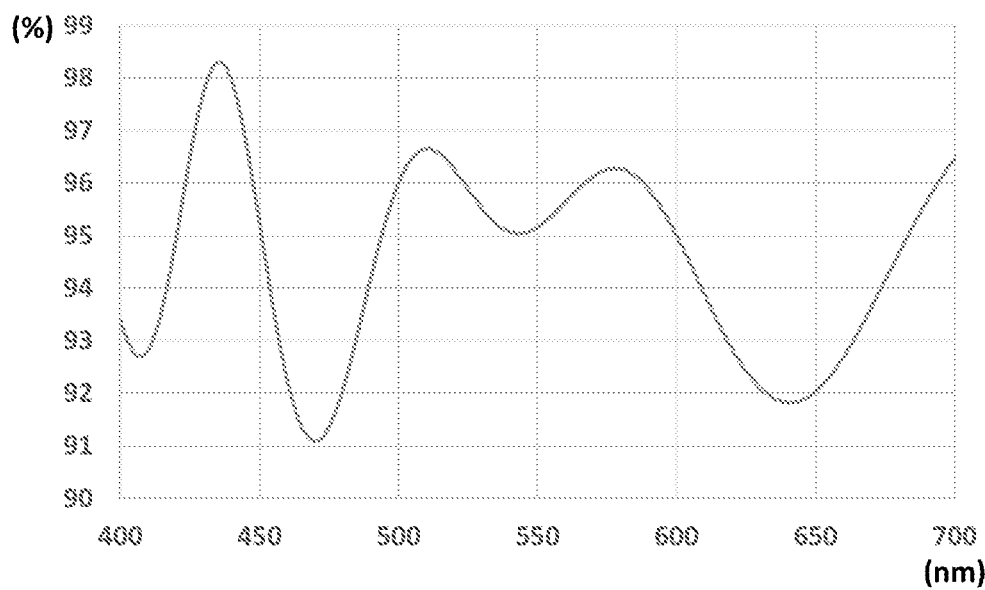

BARRIER FILM, AND WAVELENGTH CONVERSION SHEET, BACKLIGHT, AND LIQUID CRYSTAL DISPLAY DEVICE IN WHICH SAME IS USED, AS WELL AS METHOD FOR SELECTING BARRIER FILM

TECHNICAL FIELD

The present disclosure relates to a barrier film, and a wavelength conversion sheet, a backlight, a liquid crystal display device using the barrier film, and a method for selecting the barrier film.

BACKGROUND ART

With the development of a personal computer such as a portable personal computer, the demand for a liquid crystal display device has been increasing. In addition, recently, the penetration rate of a home-use liquid crystal display television has been increasing, and further, a smartphone and a tablet terminal have also been becoming widespread. Because of these, the present situation is that the market for a liquid crystal display device is expanding further.

Such a liquid crystal display device is generally configured to have a color filter, a liquid crystal cell, and a backlight. In addition, the liquid crystal display device generally controls the intensity of light by the shutter function of the liquid crystal layer in a liquid crystal cell, and displays an image by displaying the color of each pixel by dividing the color into the three primary colors of R, G, and B using color filters.

Conventionally, a cold cathode tube has been used as a light source of the backlight of the liquid crystal display device. However, in view of low power consumption and space saving, the light source of the backlight has been switched from the cold cathode tube to an LED.

As the LED used as a light source of a normal backlight, what is called a white LED formed by combining a blue LED and a YAG-based yellow phosphor is used. Such a white LED has a broad spectral distribution of emission wavelength and is called pseudo-white.

On the other hand, in recent years, the development of a backlight using quantum dot technology has also been promoted. The quantum dot refers to a nanometer-sized fine particle of a semiconductor.

The basic configuration of a backlight using a quantum dot is a combination of a light source that generates primary light (such as a blue LED that emits blue light) and a quantum dot.

The quantum dot is, for example, a nano-sized compound semiconductor fine particle composed of a semiconductor fine particle composed of a core which is CdSe and a shell which is ZnS, and a ligand which covers the periphery of the shell. The particle size of the quantum dot is smaller than the Bohr radius of an exciton of the compound semiconductor, and thus the quantum confinement effect appears. Because of this, the quantum dot has a higher light emission efficiency than the conventionally used phosphor using a rare earth ion as an activator, and can realize a high light emission efficiency of 90% or more.

In addition, the emission wavelength of the quantum dot is determined by the bandgap energy of the compound semiconductor fine particle quantized as described above, and thus an arbitrary emission spectrum can be obtained by changing the particle size of the quantum dot. A backlight that combines such a quantum dot with a blue LED or the like can realize high light emission efficiency and high color purity (see, for example, Patent Literatures 1 and 2).

While the quantum dot has the above excellent characteristics, a problem thereof is that the quantum dot is easily degraded by the influence of moisture, oxygen, or the like. Because of this, it is preferable to protect the surfaces of both sides of a quantum dot-containing layer with a barrier film.

Patent Literatures 3 and 4 propose a wavelength conversion sheet in which a quantum dot-containing layer is protected by a barrier film having a base material, an inorganic oxide layer, and an organic coating layer.

CITATION LIST

Patent Literature

PTL1: WO 2012/132239
PTL2: JP 2015-18131 A
PTL3: JP 2019-126924 A
PTL4: JP 2020-19141 A

SUMMARY OF INVENTION

Technical Problem

However, in each of liquid crystal display devices using the wavelength conversion sheets of Patent Literatures 3 and 4, there are some cases where an image having a color different from the initial one is visually recognized while the liquid crystal display device is continuously used, despite the low water vapor transmission rate of the wavelength conversion sheet. That is, there were some cases where the color was remarkably different when the color at the initial time point and the color at an arbitrary time point were compared in the liquid crystal display device using the wavelength conversion sheet of each of Patent Literatures 3 and 4. A quantum dot is characterized by increasing color purity. Accordingly, the instability of the color of the liquid crystal display device using the quantum dot is an extremely important problem in terms of quality because the characteristic of the liquid crystal display device is impaired.

In view of the above problem, it is an object of the present disclosure to provide a barrier film that can suppress a change in color when applied to a wavelength conversion sheet. In addition, it is another object of the present disclosure to provide a wavelength conversion sheet, a backlight, and a liquid crystal display device using the barrier film. In addition, it is yet another object of the present disclosure to provide a method for selecting a barrier film.

Solution to Problem

The present inventors have carried out diligent research to achieve the above objects and as a result found that when a wavelength conversion sheet to which a barrier film is applied is exposed to a high humidity environment, an organic coating layer of the barrier film swells to change the waveform of the spectral transmission spectrum of the barrier film, resulting in a change in color.

Then, the present inventors have carried out further diligent research and as a result found that by considering the central wavelength of the primary light of the backlight and causing the spectral transmission spectrum of the barrier film to show a peak or a bottom in a predetermined wavelength region, the change in color of the wavelength conversion sheet or the like to which the barrier film is applied can be suppressed.

The present disclosure provides the following [1] to [11].

[1] A barrier film for a wavelength conversion sheet that is a barrier film comprising at least one inorganic oxide layer and at least one organic coating layer on one surface of a light-transmitting base material, wherein
  a value of a water vapor transmission rate according to JIS K7129-2:2019 is 0.20 g/m²·day or less, and
  when a spectral transmittance of the barrier film is measured with a surface of a side comprising the inorganic oxide layer and the organic coating layer as a light coming-in surface, the barrier film comprises a spectral transmittance bottom at which the spectral transmittance changes from decreasing to increasing, or a spectral transmittance peak at which the spectral transmittance changes from increasing to decreasing, in the range of 450 nm±7 nm.

[2] The barrier film according to [1], wherein the barrier film comprises a spectral transmittance peak at which the spectral transmittance changes from increasing to decreasing in the range of 450 nm±7 nm.

[3] The barrier film according to [2], wherein the barrier film comprises a spectral transmittance peak at which the spectral transmittance changes from increasing to decreasing at 450 nm or more and 457 nm or less.

[4] The barrier film according to [1], wherein the barrier film comprises a spectral transmittance bottom at which the spectral transmittance changes from decreasing to increasing at 443 nm or more and 450 nm or less.

[5] The barrier film according to any one of [1] to [4], wherein the barrier film comprises an inorganic oxide layer A as the inorganic oxide layer, an organic coating layer B as the organic coating layer, an inorganic oxide layer C as the inorganic oxide layer, and an organic coating layer D as the organic coating layer in presented order on one surface of the light-transmitting base material.

[6] The barrier film according to [5], wherein the barrier film further comprises a primer layer E on the organic coating layer D.

[7] The barrier film according to any one of [1] to [4], wherein the barrier film comprises an inorganic oxide layer A as the inorganic oxide layer, an organic coating layer B as the organic coating layer, an inorganic oxide layer C as the inorganic oxide layer, and a primer layer E in presented order on one surface of the light-transmitting base material.

[8] A wavelength conversion sheet comprising: a quantum dot-containing layer comprising a quantum dot; and barrier films respectively laminated on both sides of the quantum dot-containing layer, wherein the barrier film is the barrier film according to any one of [1] to [7] and the barrier film is laminated such that a surface of an opposite side thereof from the light-transmitting base material faces a side of the quantum dot-containing layer.

[9] A backlight comprising: at least one light source that emits primary light; an optical plate that is disposed adjacent to the light source and is for light guiding or diffusion; and a wavelength conversion sheet disposed on a light going-out side of the optical plate, wherein the wavelength conversion sheet is the wavelength conversion sheet according to [8].

[10] A liquid crystal display device comprising: a backlight; and a liquid crystal panel, wherein the backlight is the backlight according to [9].

[11] A method for selecting a barrier film for a wavelength conversion sheet, the method comprising selecting a barrier film comprising at least one inorganic oxide layer and at least one organic coating layer on one surface of a light-transmitting base material, the barrier film satisfying the following criteria 1 and 2:

<Criterion 1>
A value of a water vapor transmission rate of the barrier film according to JIS K7129-2:2019 is 0.20 g/m²·day or less;
<Criterion 2>
When a spectral transmittance of the barrier film is measured with a surface of a side comprising the inorganic oxide layer and the organic coating layer as a light coming-in surface, the spectral transmittance measured comprises a spectral transmittance bottom at which the spectral transmittance changes from decreasing to increasing, or a spectral transmittance peak at which the spectral transmittance changes from increasing to decreasing, in the range of 450 nm±7 nm.

Advantageous Effects of Invention

The barrier film, and the wavelength conversion sheet, the backlight, and the liquid crystal display device using the same according to the present disclosure can suppress a change in color. In addition, the method for selecting a barrier film according to the present disclosure can easily select a barrier film that can suppress a change in color.

BRIEF DESCRIPTION OF DRAWINGS

FIG. 1 is a cross-sectional view showing one embodiment of the barrier film of the present disclosure.

FIG. 2 is a cross-sectional view showing another embodiment of the barrier film of the present disclosure.

FIG. 3 is a cross-sectional view showing another embodiment of the barrier film of the present disclosure.

FIG. 4 is a cross-sectional view showing one embodiment of the wavelength conversion sheet of the present disclosure.

FIG. 5 is a cross-sectional view showing another embodiment of the wavelength conversion sheet of the present disclosure.

FIG. 6 is a cross-sectional view showing another embodiment of the wavelength conversion sheet of the present disclosure.

FIG. 7 is a cross-sectional view showing one embodiment of the backlight of the present disclosure.

FIG. 8 is a cross-sectional view showing another embodiment of the backlight of the present disclosure.

FIG. 9 is a diagram showing the spectral transmittance of the barrier film of Example 1.

FIG. 10 is a diagram showing the spectral transmittance of the barrier film of Comparative Example 1.

DESCRIPTION OF EMBODIMENTS

Hereinafter, embodiments of the present disclosure will be described.

As used herein, the notation "AA to BB" means AA or more and BB or less.

As used herein, the refractive index of each layer means the refractive index at a wavelength of 632.8 nm. The refractive index of each layer can be calculated, for example, by fitting a reflection spectrum measured by a reflection photometer and a reflection spectrum calculated from an optical model of a multilayer thin film using a Fresnel coefficient.

In addition, as used herein, the refractive indexes of the light-transmitting base material, the inorganic oxide layer A, the organic coating layer B, the inorganic oxide layer C, and the organic coating layer D are referred to as $n_0$, $n_A$, $n_B$, $n_C$, and $n_D$, respectively. In addition, as used herein, the thicknesses of the light-transmitting base material, the inorganic oxide layer A, the organic coating layer B, the inorganic oxide layer C, and the organic coating layer D are referred to as $t_0$, $t_A$, $t_B$, $t_C$, and $t_D$, respectively.

In addition, as used herein, the reflectance R at the interface between any two layers is expressed by the following expression i when the refractive index of one layer is defined as $n_1$ and the refractive index of the other layer is defined as $n_2$.

$$R(\%)=100\times(n_1-n_2)^2/(n_1+n_2)^2 \qquad \text{(Expression i)}$$

[Barrier Film]

The barrier film of the present disclosure is a barrier film for use in a wavelength conversion sheet that is a barrier film comprising at least one inorganic oxide layer and at least one organic coating layer on one surface of a light-transmitting base material, wherein a value of a water vapor transmission rate according to JIS K7129-2:2019 is 0.20 g/m²·day or less, and when a spectral transmittance of the barrier film is measured with a surface of a side comprising the inorganic oxide layer and the organic coating layer as a light coming-in surface, the barrier film comprises a spectral transmittance bottom at which the spectral transmittance changes from decreasing to increasing, or a spectral transmittance peak at which the spectral transmittance changes from increasing to decreasing, in the range of 450 nm±7 nm.

FIG. 1 to FIG. 3 are each a cross-sectional view showing an embodiment of a barrier film (100) of the present disclosure. The barrier film (100) of each of FIG. 1 to FIG. 3 has an inorganic oxide layer A (21), an organic coating layer B (31), and an inorganic oxide layer C (22) in presented order on a light-transmitting base material (10). In addition, the barrier film (100) of FIG. 1 has an organic coating layer D (32) on an opposite side of the inorganic oxide layer C (22) from the organic coating layer B (31). In addition, the barrier film (100) of FIG. 2 has an organic coating layer D (32) and a primer layer E (40) on an opposite side of the inorganic oxide layer C (22) from the organic coating layer B (31). In addition, the barrier film (100) of FIG. 3 has a primer layer E (40) on an opposite side of the inorganic oxide layer C (22) from the organic coating layer B (31).

<Water Vapor Transmission Rate>

The barrier film is required to have a value of the water vapor transmission rate of according to JIS K7129-2:2019 of 0.20 g/m²·day or less. When the water vapor transmission rate of the barrier film exceeds 0.20 g/m²·day, the barrier film cannot suppress the degradation of the quantum dot, and thus even if the barrier film has a peak or a bottom of the spectral transmittance at 450 nm±7 nm, the change in color cannot be suppressed.

The water vapor transmission rate is preferably 0.17 g/m²·day or less, more preferably 0.15 g/m²·day or less, and further preferably 0.13 g/m²·day or less. The lower limit of the water vapor transmission rate is not particularly limited, and is usually about 0.05 g/m²·day in consideration of ease of production and cost.

The temperature and humidity conditions for measuring the water vapor transmission rate are 40° C. and a relative humidity of 90%. In addition, before measuring the water vapor transmission rate, a sample for measurement is exposed to an atmosphere having a temperature of 23° C.±5° C. and a relative humidity of 40% or more and 65% or less for 30 minutes or more.

The water vapor transmission rate can be measured, for example, using a water vapor transmission rate measuring apparatus (trade name: PERMATRAN) manufactured by MOCON, Inc.

The water vapor transmission rate can be easily set in the above range by forming two or more layers of at least one of the inorganic oxide layer and the organic coating layer. In addition, the water vapor transmission rate can be easily set in the above range by increasing the thickness of the inorganic oxide layer or the organic coating layer.

<Peak or Bottom of Spectral Transmittance>

The barrier film of the present disclosure is required to have a spectral transmittance bottom at which the spectral transmittance changes from decreasing to increasing, or a spectral transmittance peak at which the spectral transmittance changes from increasing to decreasing, in the range of 450 nm±7 nm when the spectral transmittance of the barrier film is measured with a surface of a side having the inorganic oxide layer and the organic coating layer as a light coming-in surface.

The surface of a side of the barrier film having the inorganic oxide layer and the organic coating layer refers to the surface of a side having the inorganic oxide layer and the organic coating layer with reference to the light-transmitting base material. In the barrier films of FIG. 1 to FIG. 3, the upper surface in FIG. 1 to FIG. 3 is the light coming-in surface.

Hereinafter, the technical significance of setting the position of the peak or the bottom of the spectral transmittance in the range of 450 nm±7 nm will be described.

First, the background that has led the present inventors to pay attention to the peak or the bottom of the spectral transmittance will be described.

As shown in FIG. 4 to FIG. 6, barrier films (100a, 100b) are disposed on both sides, respectively, of a quantum dot-containing layer (50) and are used as constituent members of a wavelength conversion sheet (200). Then, in a backlight including the wavelength conversion sheet, light going out from a primary light source of the backlight (generally, blue light having a central wavelength of 450 nm) comes in on a light-transmitting base material (10) of a lower barrier film (100b) of the wavelength conversion sheet (200).

When the light of the primary light source comes in on the light-transmitting base material (10) of the lower barrier film (100b) of the wavelength conversion sheet (200) of each of FIG. 4 to FIG. 6, most of the light penetrates the lower barrier film (100b) and reaches the quantum dot-containing layer (50).

Then, the light of the primary light source that has reached the quantum dot-containing layer (50) and collides with a quantum dot is converted into light having a wavelength different from that of the primary light source (hereinafter, the light that collides with the quantum dot and is converted is referred to as L2) and comes in on an upper barrier film (100a). Examples of L2 include green light and red light. On the other hand, the light of the primary light source that has reached the quantum dot-containing layer (50) and does not collide with the quantum dot remains the light having the wavelength of the primary light source and comes in on the upper barrier film (100a). Hereinafter, the light that does not collide with the quantum dot and is not converted is referred to as L1. Examples of L1 include blue light.

Then, most of the light (L1 and L2) coming in on the upper barrier film (100a) penetrates the upper barrier film (100a) and is directed to a member (for example, a brightness enhancement sheet such as a prism sheet) disposed on the viewer side of the wavelength conversion sheet (200).

The color of a liquid crystal display device to which the wavelength conversion sheet including the barrier films is applied is established by the balance between L1 and L2. Therefore, it is considered that the reason why the color of the liquid crystal display device to which the wavelength conversion sheet is applied changes with time is that the balance between L1 and L2 changes.

The present inventors have diligently researched the cause of the change in the balance between L1 and L2. First, it is considered that the amount of light of L2 gradually decreases as the quantum dot degrades. However, the degradation of the quantum dot is suppressed by the presence of the barrier films or the like, and thus the change in color cannot be explained only by the degradation of the quantum dot. In addition, when the primary light source degrades, not only L1 but also L2 is relatively reduced, and thus it is also unlikely that the degradation of the primary light source is the cause.

The present inventors have carried out further diligent research and as a result found that a synergistic action between the change in the transmittance of L1 of the upper barrier film 100a (≈ the change in the amount of light of L1 going out from the upper barrier film) and the change in the amount of light of L2 due to the degradation of the quantum dot causes the change in the color of the liquid crystal display device to which the wavelength conversion sheet including the barrier films is applied.

Then, the present inventors have found that the main cause of the change with time in the transmittance of L1 of the upper barrier film 100a (≈ the amount of light of L1 going out from the upper barrier film 100a) is the swelling of the organic coating layers due to humidity.

The statement that the spectral transmittance of the barrier film has a peak or a bottom in the range of 450 nm±7 nm means that the waveform of the spectral transmittance spectrum of the light transmitted through the barrier film has a peak or a bottom in the vicinity of 450 nm.

As described above, when the waveform of the spectral transmission spectrum of the barrier film has a peak or a bottom in the vicinity of 450 nm, it is possible to suppress the change in color when the barrier film is exposed to a high humidity environment. The reason for generation of such an effect is considered as follows.

First, when the barrier film is exposed to a high humidity environment, the organic coating layers of the barrier film swell. Then, when the organic coating layers swell, the thicknesses of the organic coating layers increase, and thus the waveform of the spectral transmittance of the barrier film shifts (mainly shifts to the long wavelength side). The spectral transmittance of the barrier film tends to change little in the vicinity of the peak or the bottom, but change greatly in a region outside the peak or the bottom. Therefore, it is considered that when the transmittance at a wavelength of 450 nm of the barrier film is in the vicinity of the peak or in the vicinity of the bottom, it is possible to suppress a change in the transmittance at 450 nm, when the organic coating layers swell and the waveform of the spectral transmission spectrum shift. The central wavelength of the primary light of the backlight using a quantum dot is approximately 450 nm, and thus it is considered that suppression of the change in the transmittance at 450 nm of the barrier film leads to the conclusion that it is possible to suppress a change in the transmittance of the light that does not collide with the quantum dot (L1) of the light of the primary light source reaching the quantum dot-containing layer (50), and also to suppress a change in the color of the backlight using the quantum dot.

The wavelength region of L2 (green and red) has a longer period of the waveform of the spectral transmission spectrum than that of L1 (blue) and thus is not easily affected by the swelling of the organic coating layers.

From the above, it is considered that by setting the position of the peak or bottom of the spectral transmittance of the barrier film in the range of 450 nm±7 nm, it is possible to suppress a change in color when the barrier film is applied to a wavelength conversion sheet.

The position of the peak or the bottom is more preferably in the range of 450 nm±5 nm, further preferably in the range of 450 nm±3 nm, and more further preferably in the range of 450 nm±1 nm.

The spectral transmittance is preferably measured with the measurement wavelength interval set to 1 nm. Examples of an apparatus for measuring the spectral transmittance include an ultraviolet-visible spectrophotometer (model number: V-670) manufactured by JASCO Corporation.

Herein, when measuring various parameters such as the spectral transmittance, the total light transmittance, the color (x value and y value in the Yxy color system), and the thickness of each layer, the measurement shall be carried out in an atmosphere having a temperature of 23° C.±5° C. and a relative humidity of 40% or more and 65% or less, unless otherwise specified. Further, a sample shall be exposed to the atmosphere for at least 30 minutes before measuring various parameters.

<<Method for Adjusting Position of Peak or Bottom>>

Next, a method for adjusting the position of the peak or the bottom will be described.

First, when the spectral transmittance of a laminated body such as a barrier film is measured, the reason why the value of the spectral transmittance differs depending on the wavelength is mainly due to the thin film interference of the laminated body.

Hereinafter, the method for adjusting the position of the peak or the bottom by thin film interference will be described using the wavelength conversion sheet of FIG. 4 as an example.

In the wavelength conversion sheet (200) of FIG. 4, L1 (light of the primary light source that has reached the quantum dot-containing layer (50) and does not collide with the quantum dot) passes through 6 interfaces before penetrating the upper barrier film 100a. The six interfaces are the interface between the quantum dot-containing layer and the organic coating layer D (interface 1), the interface between the organic coating layer D and the inorganic oxide layer C (interface 2), the interface between the inorganic oxide layer C and the organic coating layer B (interface 3), the interface between the organic coating layer B and the inorganic oxide layer A (interface 4), the interface between the inorganic oxide layer A and the light-transmitting base material (interface 5), and the interface between the light-transmitting base material and air (interface 6).

The refractive index $n_Z$ of the quantum dot-containing layer is usually smaller than the refractive index $n_D$ of the organic coating layer D. Therefore, the reflection at interface 1 is usually fixed end reflection. The transmittance (%) of L1 is approximately "100(%)−reflectance (%)." Then, for the reflectance of L1, it is necessary to consider the interference between the reflection at interface 1 and the reflection at another interface. Specifically, when the reflection at interface 1 is reduced by the interference with the reflection at another interface, the transmittance of L1 becomes high, and conversely, when the reflection at interface 1 is increased by the interference with the reflection at another interface, the transmittance of L1 becomes low.

In studying the interference between the reflection at interface 1 (usually fixed end reflection) and the reflections at interfaces 2 to 6, it is necessary to study the nature of the reflections at interfaces 2 to 6.

First, in order to simplify the description, a case will be considered in which the refractive index $n_A$ of the inorganic oxide layer A and the refractive index $n_C$ of the inorganic oxide layer C are larger than the refractive index $n_B$ of the organic coating layer B and the refractive index $n_D$ of the organic coating layer D. In this case, the reflection at interface 2 is fixed end reflection, the reflection at interface 3 is free end reflection, and the reflection at interface 4 is fixed end reflection. In addition, when $n_A$ and $n_C$ are larger than $n_B$ and $n_D$, the barrier property tends to be improved even if the thicknesses of the inorganic oxide layers are small, and thus the thicknesses of the inorganic oxide layers are usually designed to be small. Because of this, the optical distance in the fixed end reflection at interface 2 and the optical distance in the free end reflection at interface 3 can be regarded as substantially the same. Further, $n_A \approx n_C$ and $n_B \approx n_D$ usually hold true, and thus the reflectance at interface 2 and the reflectance at interface 3 are substantially the same. Therefore, it can be considered that the fixed end reflection at interface 2 and the free end reflection at interface 3 cancel each other out and do not affect the fixed end reflection at interface 1.

In addition, in order to improve the gas barrier property, usually, a design is adopted in which the refractive index $n_A$ of the inorganic oxide layer A is higher than the refractive index no of the light-transmitting base material. For such a design, the reflection at interface 5 is free end reflection. As described above, when $n_A$ and $n_C$ are larger than $n_B$ and $n_D$, the thicknesses of the inorganic oxide layers are usually designed to be small, and thus the optical distance in the fixed end reflection at interface 4 and the optical distance in the free end reflection at interface 5 can be regarded as substantially the same. Therefore, the reflectance at interface 4 and the reflectance at interface 5 are compared, and the reflection at the interface having the higher reflectance affects the fixed end reflection at interface 1. Hereinafter, a case will be described in which the reflectance at the interface (interface 4) between the inorganic oxide layer A and the organic coating layer B is larger than the reflectance at the interface (interface 5) between the light-transmitting base material and the inorganic oxide layer A. That is, in the following description, consideration is given to interface 4, not to interface 5, as a reflection that affects the fixed end reflection at interface 1.

Finally, the reflection at interface 6 will be studied. Usually, the thickness of the light-transmitting base material is designed to be sufficiently larger than the wavelength of light. Therefore, the reflection at interface 6 is a reflection that can be ignored as so-called thin film interference.

In the above case, the reflection that should be considered as the reflection that interferes with the reflection at interface 1 (usually fixed end reflection) is the fixed end reflection at interface 4. (In the above case as well, in reality, reflections at other than interface 4 also have a slight effect on the reflection at interface 1. However, here, in order to simplify the description, the description is provided assuming that only the reflection at interface 4 affects the reflection at interface 1.)

On the assumption that the reflection at interface 1 and the reflection at interface 4 are each fixed end reflection, the reflection at interface 4 weakens the reflection at interface 1 and the reflectance is reduced, when the relationship of the following expression m-1 is satisfied for light having the wavelength λ. Then, the reduction of the reflectance means that the transmittance increases. Therefore, on the assumption that the reflection at interface 1 and the reflection at interface 4 are each fixed end reflection, the transmittance of light having the wavelength λ going out from the quantum dot-containing layer is the highest when the relationship of the following expression m-1 is satisfied. The above case is based on the assumption that the thicknesses of the inorganic oxide layer A and the inorganic oxide layer C are small enough not to affect the interference; and thus the thicknesses of the inorganic oxide layers are not considered in the following expression m-1.

$$2 \times n_B \times t_B + 2 \times n_D \times t_D = \lambda/2 \quad \text{(Expression m-1)}$$

Expression m-1 can be transformed into the following expression m-2.

$$n_B \times t_B + n_D \times t_D = \lambda/4 \quad \text{(Expression m-2)}$$

From expression m-2, on the assumption that the reflection at interface 1 and the reflection at interface 4 are each fixed end reflection, it can be deemed that the transmittance at the wavelength λ is the highest when "$n_B \times t_B + n_D \times t_D$"="λ/4" is satisfied. In addition, the spectral transmittance has periodicity, and thus on the assumption that the reflection at interface 1 and the reflection at interface 4 are each fixed end reflection, it can be deemed that the transmittance at the wavelength λ is also the highest when "$n_B \times t_B + n_D \times t_D$" is an odd number times "λ/4". Then, what number times "λ/4" is "$n_B \times t_B + n_D \times t_D$" can be calculated by dividing the left side of expression m-2 by the right side.

The central wavelength of the primary light of the backlight using a quantum dot is approximately 450 nm. Assuming that λ is 450 nm, "λ/4" in expression m-2 is "112.5 nm". When "λ/4" in expression m-2 is "112.5 nm", dividing the left side of expression m-2 by the right side gives the following expression m-3. "$d_1$" in the following expression m-3 shows what number times "112.5 nm is "$n_B \times t_B + n_D \times t_D$".

$$d_1 = n_B \times t_B / 112.5 \text{ nm} + n_D \times t_D / 112.5 \text{ nm} \quad \text{(Expression m-3)}$$

Then, on the assumption that the reflection at interface 1 and the reflection at interface 4 are each fixed end reflection, when $d_1$ in expression m-3 is 2x+1 wherein x is an integer of 0 or more, the transmittance of light having a wavelength of 450 nm is the highest, and when $d_1$ in expression m-3 is 2x wherein x is an integer of 1 or more, the transmittance of light having a wavelength of 450 nm is the lowest. In other words, on the assumption that the reflection at interface 1 and the reflection at interface 4 are each fixed end reflection, when $d_1$ in expression m-3 is an odd number, the transmittance of light having a wavelength of 450 nm shows a peak, and when $d_1$ in expression m-3 is an even number, the transmittance of light having a wavelength of 450 nm shows a bottom. The light having a wavelength of 450 nm can be regarded as L1 described above.

From the above, in the above case, by setting $d_1$ in expression m-3 in the vicinity of an odd integer or the vicinity of an even integer, adjustment can be easily made in such a way as to have a peak or a bottom of the spectral transmittance in the range of 450 nm±7 nm. In addition, in the above case, when $d_1$ in expression m-3 is in the vicinity of an odd integer, the peak or the bottom is a peak at which the spectral transmittance changes from increasing to decreasing. In addition, in the above case, when $d_1$ in expression m-3 is in the vicinity of an even integer, the peak or the bottom is a bottom at which the spectral transmittance changes from decreasing to increasing.

$d_1$ in expression m-3 does not have to be exactly an integer, and if $d_1$ is an integer±about 0.10, it is easy to adjust the position of the peak or the bottom in the range of 450 nm±7 nm.

In addition, in the above case, when $d_1$ in expression m-3 is in the range of an integer to the integer+0.10, it is easy to adjust the position of the peak to 450 nm or more and 457 nm or less, and when $d_1$ is in the range of an integer−0.10 to the integer, it is easy to adjust the position of the bottom to 443 nm or more and 450 nm or less.

As described above, in reality, reflections at other than interface 4 also have a slight effect on the reflection at interface 1. Because of this, in the above case, it is preferable to carry out the basic design by the above method and make a minor correction by the simulation of the reflection spectrum, and for the simulation of the reflection spectrum, general-purpose simulation software can be used.

The reflection at interface 1 is usually fixed end reflection, but when the reflection at interface 1 is free end reflection, this may be considered as follows.

In the above case, the reflection to be considered as the reflection that interferes with the reflection at interface 1, which is free end reflection, is still the fixed end reflection at interface 4. Then, in this case, when $d_1$ in expression m-3 is 2x+1 wherein x is an integer of 0 or more, the transmittance at a wavelength of 450 nm is the lowest, and when $d_1$ in expression m-3 is 2x wherein x is an integer of 1 or more, the transmittance at a wavelength of 450 nm is the highest.

Next, a case will be studied in which the barrier film has a primer layer E on an opposite side of the organic coating layer D from the inorganic oxide layer C. In the wavelength conversion sheet using the barrier film, L1 (light of the primary light source that has reached the quantum dot-containing layer (50) and does not collide with the quantum dot) passes through 7 interfaces before penetrating the upper barrier film 100a (see FIG. 5). The seven interfaces are the interface between the quantum dot-containing layer and the primer layer E (interface 1-1), the interface between the primer layer E and the organic coating layer D (interface 1-2), the interface between the organic coating layer D and the inorganic oxide layer C (interface 2), the interface between the inorganic oxide layer C and the organic coating layer B (interface 3), the interface between the organic coating layer B and the inorganic oxide layer A (interface 4), the interface between the inorganic oxide layer A and the light-transmitting base material (interface 5), and the interface between the light-transmitting base material and air (interface 6).

The refractive index $n_Z$ of the quantum dot-containing layer is usually smaller than the refractive index $n_E$ of the primer layer E. Therefore, the reflection at interface 1-1 is usually fixed end reflection.

In studying the interference between the reflection at interface 1-1 (usually fixed end reflection) and the reflections at interface 1-2 and interfaces 2 to 6, it is necessary to study the nature of the reflections at interface 1-2 and interfaces 2 to 6.

The reflection at interface 1-2 is considered to be fixed end reflection or free end reflection. Here, usually, in order to lower the reflectance at interface 1-2, the refractive index $n_E$ of the primer layer E and the refractive index $n_D$ of the organic coating layer D are designed to have a small difference in refractive index. Therefore, the reflection at interface 1-2 having a low reflectance can be ignored.

It can be considered that the reflection at interface 2 and the reflection at interface 3 cancel each other out and do not affect the fixed end reflection at interface 1-1, as in the case of not having the primer layer E.

The relationship between the reflection at interface 4 and the reflection at interface 5 will be studied assuming that the reflection at interface 4 is higher, as in the above case. Therefore, here, the reflection at interface 5 is not considered, but the reflection at interface 4 is considered. The reflection at interface 6 is a reflection that can be ignored as so-called thin film interference.

Therefore, the reflection that should be considered as the reflection that interferes with the reflection at interface 1-1 (usually fixed end reflection) is the fixed end reflection at interface 4. Then, it is necessary to consider the optical distance of the primer layer ($n_E \times t_E$) as the optical distance in the fixed end reflection at interface 4. (In the above case as well, in reality, reflections at other than interface 4 also have a slight effect on the reflection at interface 1-1. However, here, in order to simplify the description, the description is provided assuming that only the reflection at interface 4 affects the reflection at interface 1-1.)

On the assumption that the reflection at interface 1-1 and the reflection at interface 4 are each fixed end reflection, the reflection at interface 4 weakens the reflection at interface 1-1 and the reflectance is reduced, when the relationship of the following expression n-1 is satisfied for light having the wavelength λ. Then, the reduction of the reflectance means that the transmittance increases. Therefore, on the assumption that the reflection at interface 1-1 and the reflection at interface 4 are each fixed end reflection, the transmittance of light having the wavelength λ going out from the quantum dot-containing layer is the highest when the relationship of the following expression n-1 is satisfied. The above case is based on the assumption that the thicknesses of the inorganic oxide layer A and the inorganic oxide layer C are small enough not to affect the interference; and thus the thicknesses of the inorganic oxide layers are not considered in the following expression n-1.

$$2 \times n_B \times t_B + 2 \times n_D \times t_D + 2 \times n_E \times t_E = \lambda/2 \quad \text{(Expression n-1)}$$

Expression n-1 can be transformed into the following expression n-2.

$$n_B \times t_B + n_D \times t_D + n_E \times t_E = \lambda/4 \quad \text{(Expression n-2)}$$

From expression n-2, on the assumption that the reflection at interface 1-1 and the reflection at interface 4 are each fixed end reflection, it can be deemed that the transmittance at the wavelength λ is the highest when "$n_B \times t_B + n_D \times t_D + n_E \times t_E$"="λ/4" is satisfied. In addition, the spectral transmittance has periodicity, and thus on the assumption that the reflection at interface 1-1 and the reflection at interface 4 are each fixed end reflection, it can be deemed that the transmittance at the wavelength λ is also the highest when "$n_B \times t_B + n_D \times t_D + n_E \times t_E$" is an odd number times "λ/4". Then, what number times "λ/4" is "$n_B \times t_B + n_D \times t_D + n_E \times t_E$" can be calculated by dividing the left side of expression n-2 by the right side.

The central wavelength of the primary light of the backlight using a quantum dot is approximately 450 nm. Assuming that λ is 450 nm, "λ/4" in expression n-2 is "112.5 nm". When "λ/4" of expression n-2 is "112.5 nm", dividing the left side of expression n-2 by the right side gives the following expression n-3. "$d_2$" in the following expression n-3 shows what number times "112.5 nm" is "$n_B \times t_B + n_D \times t_D + n_E \times t_E$".

$$d_2 = n_B \times t_B/112.5 \text{ nm} + n_D \times t_D/112.5 \text{ nm} + n_E \times t_E/112.5 \text{ nm} \quad \text{(Expression n-3)}$$

Then, on the assumption that the reflection at interface 1-1 and the reflection at interface 4 are each fixed end reflection, when $d_2$ in expression n-3 is 2y+1 wherein y is an integer of 0 or more, the transmittance of light having a wavelength of 450 nm is the highest, and when $d_2$ in expression n-3 is 2y wherein y is an integer of 1 or more, the transmittance of light having a wavelength of 450 nm is the lowest. The light having a wavelength of 450 nm can be regarded as L1 described above.

From the above, in the above case, by setting $d_2$ in expression n-3 in the vicinity of an odd integer or the vicinity of an even integer, adjustment can be easily made in such a way as to have a peak or a bottom of the spectral transmittance in the range of 450 nm±7 nm. In addition, in the above case, when $d_2$ in expression n-3 is in the vicinity of an odd integer, the peak or the bottom is a peak at which the spectral transmittance changes from increasing to decreasing. In addition, in the above case, when $d_2$ in expression n-3 is in the vicinity of an even integer, the peak or the bottom is a bottom at which the spectral transmittance changes from decreasing to increasing.

$d_2$ in expression n-3 does not have to be exactly an integer, and if $d_2$ is an integer±about 0.10, it is easy to adjust the position of the peak or the bottom in the range of 450 nm±7 nm.

In addition, in the above case, when $d_2$ in expression m-3 is in the range of an integer to the integer+0.10, it is easy to adjust the position of the peak to 450 nm or more and 457 nm or less, and when $d_2$ is in the range of an integer−0.10 to the integer, it is easy to adjust the position of the bottom to 443 nm or more and 450 nm or less.

The reflection at interface 1-1 is usually fixed end reflection, but when the reflection at interface 1-1 is free end reflection, this may be considered as follows.

In this case, the reflection to be considered as the reflection that interferes with the reflection at interface 1-1, which is free end reflection, is still the fixed end reflection at interface 4. Then, in this case, when $d_2$ in expression n-3 is 2y+1 wherein y is an integer of 0 or more, the transmittance at a wavelength of 450 nm is the lowest, and when $d_2$ in expression n-3 is 2y wherein y is an integer of 1 or more, the transmittance at a wavelength of 450 nm is the highest.

As described above, in reality, reflections at other than interface 4 also have a slight effect on the reflection at interface 1-1. Because of this, in the above case, it is preferable to carry out the basic design by the above method and make a minor correction by the simulation of the reflection spectrum, and for the simulation of the reflection spectrum, general-purpose simulation software can be used.

Even in a case different from the above case, the position of the peak or the bottom of the spectral transmittance of the barrier film can be adjusted by considering the action of thin film interference based on the refractive index and the thickness of each layer.

For example, in the wavelength conversion sheet having the layer configuration of FIG. 4, when a polyethylene terephthalate film generally used as a light-transmitting base material is used, and an inorganic oxide layer having a low refractive index and a large thickness is used, among the interfaces through which L1 passes, the interface between the inorganic oxide layer and the light-transmitting base material usually shows the highest reflectance. In this case, consideration may be mainly given to the reflection at the interface between the inorganic oxide layer and the light-transmitting base material, as the reflection that interferes with the reflection at the interface between the quantum dot-containing layer and the barrier film.

The peak or the bottom is preferably a peak at which the spectral transmittance changes from increasing to decreasing. In addition, the central wavelength of the primary light source of the backlight using a quantum dot is approximately 450 nm. Therefore, the peak or the bottom in the range of 450 nm±7 nm that is a peak at which the spectral transmittance changes from increasing to decreasing is preferable in that thereby the transmittance of the light of the primary light source that has reached the quantum dot-containing layer and does not collide with the quantum dot (L1) can be increased.

When the inorganic oxide layer is a layer including silicon oxide, the b* value of the barrier film in the L*a*b* color system tends to increase. A film having a high b* value and a yellowish tinge may be avoided from the viewpoint of the visibility of an image display device. Because of this, the peak or the bottom in the range of 450 nm±7 nm that is a peak at which the spectral transmittance changes from increasing to decreasing is preferable in that thereby even if the inorganic oxide layer is a layer including silicon oxide, it is easy to suppress the yellowish tinge of the barrier film.

When the peak or the bottom is a peak at which the spectral transmittance changes from increasing to decreasing, the barrier film preferably has a spectral transmittance peak at 450 nm or more and 457 nm or less.

In a barrier film having a peak at a position in the range of 450 nm or more and 457 nm or less, the transmittance at a wavelength of 450 nm decreases when the organic coating layers swell and the waveform of the spectral reflectance of the barrier film shifts to the long wavelength side. That is, in the barrier film having a peak at a position in the range of 450 nm or more and 457 nm or less, the transmittance of L1 decreases when the organic coating layers swell.

On the other hand, the amount of the light resulting from the conversion by the quantum dot (L2) gradually decreases with the degradation of the quantum dot.

Therefore, the barrier film having a peak at a position in the range of 450 nm or more and 457 nm or less is preferable in that the amount of light of L2 decreases with the degradation of the quantum dot, and the transmittance of L1 also decreases, and thus the balance between L1 and L2 is less likely to be lost, and the change in color can be further suppressed.

It is also preferable that the peak or the bottom be a bottom at which the spectral transmittance changes from decreasing to increasing, and that the barrier film have a spectral transmittance bottom at 443 nm or more and 450 nm or less.

In a barrier film having a bottom at a position in the range of 443 nm or more and 450 nm or less, the transmittance at a wavelength of 450 nm decreases when the organic coating layers swell and the waveform of the spectral reflectance of the barrier film shifts to the long wavelength side. That is, in the barrier film having a bottom at a position in the range of 443 nm or more and 450 nm or less, the transmittance of L1 decreases when the organic coating layers swell.

On the other hand, the amount of the light resulting from the conversion by the quantum dot (L2) gradually decreases with the degradation of the quantum dot.

Therefore, the barrier film having a bottom at a position in the range of 443 nm or more and 450 nm or less is preferable in that the amount of light of L2 decreases with the degradation of the quantum dot, and the transmittance of L1 also decreases, and thus the balance between L1 and L2 is less likely to be lost, and the change in color can be further suppressed.

<Layer Configuration>

The barrier film of the present disclosure is not particularly limited in layer configuration as long as the barrier film has at least one inorganic oxide layer and at least one organic coating layer on one surface of a light-transmitting base material, and has a water vapor transmission rate and a spectral transmittance satisfying the conditions described above.

From the viewpoint of the barrier property, the barrier film preferably has a laminated configuration having two or more inorganic oxide layers and at least one organic coating layer on one surface of a light-transmitting base material. In addition, from the viewpoint of the barrier property and close adhesion to the quantum dot-containing layer, the barrier film more preferably has a laminated configuration having two or more inorganic oxide layers, at least one organic coating layer, and a primer layer on one surface of the light-transmitting base material. As in these preferable embodiments, when the number of laminated layers of the inorganic oxide layers and the organic coating layers disposed on the light-transmitting base material increases and the thickness increases, the period of the waveform of the spectral transmittance easily becomes shorter, and thus it is possible to easily exert the effect produced by setting the peak or the bottom in the vicinity of 450 nm.

Examples of the layer configuration of the barrier film of the present disclosure include the configurations of the following (1) to (3). In the following (1) to (3), "I" means the interface between layers. The configurations of the following (1) to (3) are preferable in that these have an excellent barrier property. Among these, the configurations of the following (2) and (3) are preferable in that these have excellent close adhesion to the quantum dot-containing layer. In addition, in the configurations of the following (1) to (3), the period of the waveform of the spectral transmittance easily becomes shorter than in ones having a small number of layers of a light-transmitting base material (for example, one having one inorganic oxide layer and one organic coating layer on a light-transmitting base material), and thus it is possible to easily exert the effect produced by setting the peak or bottom in the vicinity of 450 nm.

The layer configurations of (1) to (3) may have another functional layer such as a light diffusion layer on the surface of an opposite side of the light-transmitting base material from the inorganic oxide layer A.

(1) Light-transmitting base material/inorganic oxide layer A/organic coating layer B/inorganic oxide layer C/organic coating layer D (2) Light-transmitting base material/inorganic oxide layer A/organic coating layer B/inorganic oxide layer C/organic coating layer D/primer layer E (3) Light-transmitting base material/inorganic oxide layer A/organic coating layer B/inorganic oxide layer C/primer layer E The barrier film may have a layer other than the above as long as the layer does not impair the effects of the present disclosure.

Examples of the layer configuration of the barrier film of the present disclosure also includes the configurations of the following (4) and (5). However, the laminated configurations of the following (4) and (5) are disadvantageous in terms of the optical property because the number of interfaces is larger than in those of the above (2) and (3), and the total thickness is also increased. Because of this, the laminated configurations of the above (1) to (3) are preferable.

(4) First light-transmitting base material/inorganic oxide layer A/organic coating layer B/inorganic oxide layer C/organic coating layer D/second light-transmitting base material/primer layer (5) First light-transmitting base material/inorganic oxide layer A/organic coating layer B/inorganic oxide layer C/second light-transmitting base material/primer layer The above (1) is a configuration that has an inorganic oxide layer A as the inorganic oxide layer, an organic coating layer B as the organic coating layer, an inorganic oxide layer C as the inorganic oxide layer, and an organic coating layer D as the organic coating layer in presented order on one surface of a light-transmitting base material.

In the configuration of the above (1), any adjacent layers of the inorganic oxide layer A, the organic coating layer B, the inorganic oxide layer C, and the organic coating layer D are preferably in contact with each other. In addition, the light-transmitting base material and the inorganic oxide layer A are preferably in contact with each other.

The above (2) is a configuration that further has a primer layer E on the organic coating layer D of the above (1). In the above (2), the organic coating layer D and the primer layer E are preferably in contact with each other.

The above (3) is a configuration that has an inorganic oxide layer A as the inorganic oxide layer, an organic coating layer B as the organic coating layer, an inorganic oxide layer C as the inorganic oxide layer, and a primer layer E in presented order on one surface of a light-transmitting base material.

In the configuration of the above (3), any adjacent layers of the inorganic oxide layer A, the organic coating layer B, the inorganic oxide layer C, and the primer layer E are preferably in contact with each other. In addition, the light-transmitting base material and the inorganic oxide layer A are preferably in contact with each other.

<Thickness>

The total thickness of the inorganic oxide layers and the organic coating layers is preferably 150 nm or more and 1500 nm or less, more preferably 200 nm or more and 800 nm or less, and further preferably 300 nm or more and 650 nm or less. By setting the total thickness to 150 nm or more, the barrier property can be easily improved. In addition, by setting the total thickness to 1500 nm or less, it is possible to suppress excessive shortening of the period of the waveform of the spectral transmittance and easily exert the effect produced by having a peak or a bottom of the spectral transmittance in the range of 450 nm±7 nm.

The total thickness of the inorganic oxide layers, the organic coating layers, and the primer layer is preferably 300 nm or more and 1700 nm or less, more preferably 400 nm or more and 900 nm or less, further preferably 450 nm or more and 800 nm or less, and further preferably 500 nm or more and 750 nm or less. By setting the total thickness to 300 nm or more, the barrier property can be easily improved. In addition, by setting the total thickness to 1700 nm or less, it is possible to suppress excessive shortening of the period of the waveform of the spectral transmittance and easily exert the effect produced by having a peak or a bottom of the spectral transmittance in the range of 450 nm±7 nm.

<Light-Transmitting Base Material>

The light-transmitting base material is not particularly limited as long as it is a resin film that does not impair a function of a wavelength conversion sheet when applied to the wavelength conversion sheet.

Examples of the light-transmitting base material include resin films formed of one or more resins selected from the group consisting of polyester, triacetyl cellulose (TAC), cellulose diacetate, cellulose acetate butyrate, polyamide, polyimide, polyethersulfone, polysulfone, polypropylene, polymethylpentene, polyvinyl chloride, polyvinyl acetal, polyether ketone, acrylic, polycarbonate, polyurethane, an amorphous olefin (Cyclo-Olefin-Polymer: COP), and the like.

Among these resin films, a stretched polyester film, particularly a biaxially stretched polyester film, is preferable in view of mechanical strength, dimensional stability, and heat resistance. Examples of the polyester film include a polyethylene terephthalate film and a polyethylene naphthalate film.

The light-transmitting base material may be a single layer of a resin film or may have a plurality of resin films. When the light-transmitting base material has a plurality of resin films, each resin film may be directly bonded or may be bonded via an adhesive layer.

The thickness $t_0$ of the light-transmitting base material is preferably 5 μm or more, more preferably 8 μm or more, and further preferably 10 μm or more. By setting the thickness of the light-transmitting base material to 5 μm or more, the strength of the barrier film can be easily improved. By setting the thickness of the light-transmitting base material to 5 μm or more, the optical distance of the light-transmitting base material is sufficiently larger than the wavelength of visible light, and thus the influence of the light-transmitting base material on the waveform of the spectral transmission spectrum of the barrier film can be easily ignored.

The thickness $t_0$ of the light-transmitting base material is preferably 200 μm or less, more preferably 150 μm or less, more preferably 100 μm or less, more preferably 50 μm or less, and more preferably 25 μm or less, in view of thinning and easily suppressing invasion by water vapor and oxygen from an end portion.

Herein, the thickness of each layer constituting the barrier film such as the thickness $t_0$ of the light-transmitting base material, and the thickness of the quantum dot-containing layer can be calculated, for example, by photographing a cross section using a scanning transmission electron microscope (STEM), measuring the thicknesses at 20 points from an image of the cross section, and averaging the values at the 20 points.

When a plurality of upper limit options and a plurality of lower limit options of a numerical value are indicated in a constitutional requirement shown herein, one selected from the upper limit options and one selected from the lower limit options can be combined to provide an embodiment of a numerical range. For example, in the case of the thickness $t_0$ of the light-transmitting base material, examples of the embodiment of a numerical range include 5 μm or more and 200 μm or less, 5 μm or more and 25 μm or less, 8 μm or more and 50 μm or less, 10 μm or more and 50 μm or less, and 10 μm or more and 25 μm or less.

When the light-transmitting base material is constituted by two resin films, the thickness of a first resin film on the side forming the inorganic oxide layer or the like is preferably 5 μm or more and 50 μm or less, more preferably 8 μm or more and 25 μm or less, and further preferably 10 μm or more and 20 μm or less. When the first resin film has the above thickness, the production efficiency of the inorganic oxide layer can be easily improved and the handleability can be easily improved.

In addition, the thickness of a second resin film on the side far from the inorganic oxide layer or the like is preferably 5 μm or more and 150 μm or less, more preferably 8 μm or more and 100 μm or less, and further preferably 10 μm or more and 50 μm or less. When the second resin film has the above thickness, the balance between the handleability and the rigidity of the barrier film can be easily improved.

When the light-transmitting base material is constituted by two resin films, the two resin films may be bonded to each other via an adhesive layer, followed by forming the inorganic oxide layer or the like. Alternatively, after the inorganic oxide layer or the like is formed on the first resin film, the second resin film may be bonded to the surface of the opposite side of the first resin film from the inorganic oxide layer or the like via an adhesive layer. The thickness of the adhesive layer is preferably 3 μm or more and 100 μm or less, more preferably 3 μm or more and 50 μm or less, and further preferably 4 μm or more and 8 μm or less. If the thickness of the adhesive layer is too small, poor coating may occur, and if the thickness is too large, curing may be insufficient.

The total light transmittance according to JIS K7361-1: 1997 of the light-transmitting base material is preferably 80% or more, more preferably 85% or more, and further preferably 87% or more.

A desired surface treatment may be applied in advance to the surface of the side of the light-transmitting base material on which the inorganic oxide layer or the like is provided, in order to improve close adhesion or the like. Examples of the surface treatment include corona discharge treatment, ozone treatment, low temperature plasma treatment using oxygen gas, nitrogen gas, or the like, glow discharge treatment, and oxidation treatment using a chemical or the like.

<Inorganic Oxide Layer>

The barrier film of the present disclosure has an inorganic oxide layer on a light-transmitting base material. The inorganic oxide layer mainly has the action of improving the barrier property.

Only one inorganic oxide layer may be provided, and two inorganic oxide layers are preferably provided, on the light-transmitting base material. Three or more inorganic oxide layers may be provided, and two inorganic oxide layers are preferably provided from the viewpoint of cost effectiveness. As used herein, the two inorganic oxide layers on the light-transmitting base material are referred to as the inorganic oxide layer A and the inorganic oxide layer C.

By having the two inorganic oxide layers on the light-transmitting base material, the barrier property of the barrier film against oxygen and water vapor can be improved to easily suppress the degradation of the quantum dot. In addition, if an attempt is made to improve the barrier property by a single inorganic oxide layer, the thickness of the inorganic oxide layer becomes large so that a crack is likely to occur in the inorganic oxide layer, and thus it is difficult for the barrier property to be kept good for a long period of time. However, by having two inorganic oxide layers, it is possible to suppress the increase in the thickness of each inorganic oxide layer so that a crack is unlikely to occur, and it is thus easy to keep the barrier property good for a long period of time.

Even if the thickness of the inorganic oxide layer is reduced, a crack or a pinhole may occur. However, even if a crack or a pinhole occurs in each of the two inorganic oxide layers, it is possible to impart a predetermined barrier property as a laminated body as long as the positions of the cracks or pinholes do not match in the plane direction. In other words, it is preferable to use two inorganic oxide layers in that it is easy to impart a predetermined barrier property even when cracks or pinholes occur in the inorganic oxide layers.

Examples of the inorganic oxide layer A and the inorganic oxide layer C include a layer made of one selected from the group consisting of aluminum oxide, magnesium oxide, indium tin oxide (ITO), and silicon oxide, or a mixture thereof.

The compositions, various physical properties, and the like of the inorganic oxide layer A and the inorganic oxide layer C may be the same or different. In consideration of the balance among the physical properties and the like of the barrier film, at least a part of the compositions, various physical properties, and the like of the inorganic oxide layer A and the inorganic oxide layer C is preferably substantially the same.

For example, the refractive index $n_A$ of the inorganic oxide layer A and the refractive index $n_C$ of the inorganic oxide layer C are preferably substantially the same. The statement that $n_A$ and $n_C$ are substantially the same means that $n_A/n_C$ is 0.98 or more and 1.02 or less, and $n_A/n_C$ is preferably 0.99 or more and 1.01 or less, and more preferably 1.00. In addition, the thickness $t_A$ of the inorganic oxide layer A and the thickness $t_C$ of the inorganic oxide layer C are preferably substantially the same. The statement that to and $t_C$ are substantially the same means that $t_A/t_C$ is 0.95 or more and 1.05 or less, and $t_A/t_C$ is preferably 0.97 or more and 1.03 or less, and more preferably 0.99 or more and 1.01 or less.

An inorganic oxide layer having a high refractive index tends to have a good barrier property. Above all, aluminum oxide has a high refractive index and a good barrier property. Because of this, by using aluminum oxide as the inorganic oxide layer A and the inorganic oxide layer C, it becomes easy to impart a predetermined barrier property even if the thickness of the inorganic oxide layers is reduced, and thus the inorganic oxide layers can be easily thinned to a level that has almost no influence on the waveform of the spectral transmission spectrum of the barrier film, and further, the transparency can also be improved.

The inorganic oxide layer A and the inorganic oxide layer C are preferably layers including aluminum oxide or silicon oxide from the viewpoint of transparency, productivity, and the like.

In addition, at least one of the inorganic oxide layer A and the inorganic oxide layer C is preferably a layer including aluminum oxide from the viewpoint of a sufficient barrier property, transparency, productivity, and the like, and both of the inorganic oxide layer A and the inorganic oxide layer C are more preferably layers including aluminum oxide.

The content of aluminum oxide or silicon oxide in the inorganic oxide layer A or the inorganic oxide layer C is preferably 80% by mass or more, more preferably 90% by mass or more, and further preferably 95% by mass or more on a mass basis.

Examples of an embodiment of a combination of the inorganic oxide layer A and the inorganic oxide layer C include the following (1) to (4).

(1) An embodiment in which the inorganic oxide layer A and the inorganic oxide layer C are each a layer including aluminum oxide
(2) An embodiment in which the inorganic oxide layer A and the inorganic oxide layer C are each a layer including silicon oxide
(3) An embodiment in which the inorganic oxide layer A is a layer including aluminum oxide, and the inorganic oxide layer C is a layer including silicon oxide
(4) An embodiment in which the inorganic oxide layer A is a layer including silicon oxide, and the inorganic oxide layer C is a layer including aluminum oxide When the thickness of the inorganic oxide layer is too small, the barrier property tends to decrease, and when the thickness is too large, a scratch or a crack tends to easily occur. The thickness $t_A$ of the inorganic oxide layer A and the thickness $t_C$ of the inorganic oxide layer C are preferably set in an appropriate range depending on the materials of the inorganic oxide layers so as to have a good balance among the barrier property, scratch suppression, and crack suppression.

$t_A$ and $t_C$ may be different from each other, and are preferably substantially the same as described above.

For example, when the inorganic oxide layer A and the inorganic oxide layer C are layers including aluminum oxide, the lower limit of each of $t_A$ and $t_C$ is 6 nm or more, and more preferably 7 nm or more. By setting $t_A$ and $t_C$ to 6 nm or more, the barrier property can be easily improved.

In terms of the upper limit, each of $t_A$ and $t_C$ is preferably 25 nm or less, more preferably 20 nm or less, more preferably 15 nm or less, more preferably 12 nm or less, and more preferably 10 nm or less. By setting $t_A$ and $t_C$ to 25 nm or less, the occurrence of a scratch and a crack in the inorganic oxide layer A and the inorganic oxide layer C can be easily suppressed. In addition, the thinner $t_A$ and $t_C$, the more easily the influence of the inorganic oxide layer A and the inorganic oxide layer C on the waveform of a spectral transmission spectrum of the barrier film can be reduced to a negligible level (in view of the waveform of the spectral transmission spectrum, the thickness of each of the inorganic oxide layer A and the inorganic oxide layer C is preferably 12 nm or less and more preferably 10 nm or less).

In addition, when the inorganic oxide layer A and the inorganic oxide layer C are layers including any one or more of silicon oxide, magnesium oxide, and indium tin oxide (ITO), the lower limit of each of $t_A$ and $t_C$ is preferably 20 nm or more, more preferably 25 nm or more, and more preferably 27 nm or more. By setting $t_A$ and $t_C$ to 20 nm or more, the barrier property can be easily improved.

In addition, the upper limit of each of $t_A$ and $t_C$ is preferably 100 nm or less, more preferably 75 nm or less, further preferably 60 nm or less, and more further preferably 50 nm or less. By setting $t_A$ and $t_C$ to 100 nm or less, the occurrence of a scratch and a crack in the inorganic oxide layer A and the inorganic oxide layer C can be easily suppressed.

The inorganic oxide layer can be formed, for example, by physical vapor deposition method such as a vacuum vapor deposition method, a sputtering method, and an ion plating method, or a chemical vapor deposition method such as a plasma chemical vapor deposition method, a thermochemical vapor deposition method, and a photochemical vapor deposition method. Among these, the vacuum vapor deposition method, which has a high vapor deposition rate and good productivity, is preferable.

<Organic Coating Layer>

The barrier film of the present disclosure has the organic coating layer. By having an organic coating layer in combination with an inorganic oxide layer, the barrier property of the barrier film can be improved to easily suppress the degradation of the quantum dot. In addition, the organic coating layer has better flexibility than the inorganic oxide layer, and thus by the organic coating layer, the occurrence of a scratch and a crack in the inorganic oxide layer can be easily suppressed.

The organic coating layer is preferably formed in contact with the inorganic oxide layer.

Only one organic coating layer may be provided, and two organic coating layers are preferably provided, on the light-transmitting base material. Three or more organic coating layers may be provided, and one or two organic coating layers are preferably provided from the viewpoint of cost effectiveness.

As used herein, when one organic coating layer is provided on the light-transmitting base material, the organic coating layer is referred to as the organic coating layer B. In addition, when two organic coating layers are provided on the light-transmitting base material, the organic coating layer on the side closer to the light-transmitting base material is referred to as the organic coating layer B, and the organic coating layer on the side farther from the light-transmitting base material is referred to as the organic coating layer D.

The organic coating layer preferably includes one or more selected from the group consisting of a water-soluble polymer and a metal alkoxide-based compound. The organic coating layer includes more preferably one or more selected from the group consisting of a water-soluble polymer, and further preferably one or more selected from the group consisting of a water-soluble polymer and one or more selected from the group consisting of a metal alkoxide-based compound, among a water-soluble polymer and a metal alkoxide-based compound.

Examples of the water-soluble polymer include polyvinyl alcohol, polyvinylpyrrolidone, and an ethylene-vinyl alcohol copolymer. Among these, polyvinyl alcohol and an ethylene-vinyl alcohol copolymer are preferable, and polyvinyl alcohol is more preferable, in view of the barrier property. That is, the organic coating layer includes preferably one or more selected from the group consisting of polyvinyl alcohol and an ethylene-vinyl alcohol copolymer, and more preferably polyvinyl alcohol.

When the organic coating layer contains a water-soluble polymer and a metal alkoxide-based compound, the content of the water-soluble polymer is preferably 5 parts by mass or more and 500 parts by mass or less, more preferably 7 parts by mass or more and 100 parts by mass or less, and further preferably 8 parts by mass or more and 50 parts by mass or less, per 100 parts by mass in total of the metal alkoxide-based compound.

Examples of the metal alkoxide-based compound include a metal alkoxide, a metal alkoxide hydrolysate, and a metal alkoxide polymer.

The metal alkoxide is a compound represented by the general formula $M(OR)_n$. In the formula, M represents a metal such as Si, Ti, Al, and Zr, and R represents an alkyl group such as a methyl group and an ethyl group. Specific examples of the metal alkoxide include tetramethoxysilane, tetraethoxysilane, and isopropoxyaluminum.

An organic coating layer can be formed, for example, by applying a coating liquid including a component constituting the organic coating layer on the inorganic oxide layer and drying the same. The coating liquid may contain an additive such as a silane coupling agent, a curing agent, or a dispersant.

The compositions, various physical properties, and the like of the organic coating layer B and the organic coating layer D may be the same or different. In consideration of the balance among the physical properties and the like of the barrier film, at least a part of the compositions, various physical properties, and the like of the organic coating layer B and the organic coating layer D is preferably substantially the same.

For example, the refractive index $n_B$ of the organic coating layer B and the refractive index $n_D$ of the organic coating layer D are preferably substantially the same. The statement that $n_B$ and $n_D$ are substantially the same means that $n_B/n_D$ is 0.98 or more and 1.02 or less, and $n_B/n_D$ is preferably 0.99 or more and 1.01 or less, and more preferably 1.00. In addition, the thickness $t_B$ of the organic coating layer B and the thickness $t_D$ of the organic coating layer D are preferably substantially the same. The statement that $t_B$ and $t_D$ are substantially the same means that $t_B/t_D$ is 0.95 or more and 1.05 or less, and $t_B/t_D$ is preferably 0.97 or more and 1.03 or less and more preferably 0.99 or more and 1.01 or less.

In terms of the lower limit, each of the refractive index $n_B$ of the organic coating layer B and the refractive index $n_D$ of the organic coating layer D is preferably 1.45 or more, more preferably 1.50 or more, and further preferably 1.52 or more. In terms of the upper limit, each of $n_B$ and $n_D$ is preferably 1.64 or less, more preferably 1.60 or less, and further preferably 1.57 or less. Even when the number of organic coating layers is one, the refractive index is preferably in the above range.

In terms of the lower limit, each of the thickness $t_B$ of the organic coating layer B and the thickness $t_D$ of the organic coating layer D is preferably 70 nm or more, more preferably 85 nm or more, and further preferably 100 nm or more. By setting $t_B$ and $t_D$ to 70 nm or more, the barrier property can be easily improved.

In addition, the upper limit of each of $t_B$ and $t_D$ is preferably 480 nm or less, more preferably 400 nm or less, and further preferably 300 nm or less. By setting $t_B$ and $t_D$ to 480 nm or less, it is possible to thin the barrier film, and it is possible to easily suppress excessive swelling of the organic coating layer B and the organic coating layer D and suppress a change in color. In addition, if $t_B$ and $t_D$ are too thick, the stress generated when the organic coating layers are applied and dried is large, and the stress may cause a crack in the inorganic oxide layers to reduce the barrier property. Accordingly, by setting $t_B$ and $t_D$ to 480 nm or less, the initial barrier property can be easily improved.

Even when the number of organic coating layers is one, the thickness is preferably in the above range.

<Primer Layer>

The barrier film may have a primer layer (primer layer E) in addition to an inorganic oxide and an organic coating layer.

The primer layer is preferably disposed as the outermost layer of the barrier film. By having a primer layer, the close adhesion between the barrier film and the quantum dot-containing layer is improved, and the barrier property of the barrier film is easily maintained for a long period of time, and thus the change in color over time can be suppressed.

In addition, in a configuration in which a primer layer is disposed in contact with an inorganic oxide layer, it can also be expected that the primer layer makes it difficult for a scratch and a crack to occur in the inorganic oxide layer.

The refractive index $n_E$ of the primer layer E is not particularly limited, and the lower limit thereof is preferably 1.47 or more, more preferably 1.52 or more, and further preferably 1.55 or more. In terms of the upper limit, $n_E$ is preferably 1.66 or less, more preferably 1.62 or less, and further preferably 1.60 or less.

The thickness $t_E$ of the primer layer E is preferably 70 nm or more and 1000 nm or less, more preferably 100 nm or more and 500 nm or less, and further preferably 120 nm or more and 300 nm or less.

<<Composition>>

The primer layer E preferably includes a resin component such as a polyurethane-based resin composition. The polyurethane-based resin easily improves the close adhesion to the quantum dot-containing layer, and also plays the role of alleviating the stress generated when the quantum dot-containing layer is ionizing radiation-cured or heat-cured, to thereby make it difficult for the stress to be transmitted to the inorganic oxide layers and the organic coating layers. Further, the polyurethane-based resin can improve the degree of extension of the primer layer E to thereby easily suppress the occurrence of a crack in layers constituting the barrier film such as the inorganic oxide layers.

Examples of the polyurethane-based resin composition include a one-pack or two-pack polyurethane-based resin composition obtained by reacting a polyfunctional isocyanate with a hydroxyl group-containing compound. Only one of each of the polyfunctional isocyanate and the hydroxyl group-containing compound may be used, or a plurality of each thereof may be used.

Specific examples of the polyfunctional isocyanate include an aromatic polyisocyanate such as tolylene diisocyanate, diphenylmethane diisocyanate, xylylene diisocyanate, or polymethylene polyphenylene polyisocyanate, and an aliphatic polyisocyanate such as hexamethylene diisocyanate or isophorone diisocyanate.

Examples of the hydroxyl group-containing compound include a polyether polyol, a polyester polyol, a polyester polyurethane polyol, and a polyacrylate polyol. In the present disclosure, a polyester polyurethane polyol is particularly preferable in view of close adhesion to the quantum dot-containing layer and durability. The polyester polyurethane polyol can be produced, for example, by the method described in JP 2001-288408 A or JP 2003-26996 A.

The content of the polyurethane-based resin composition is preferably 40% by mass or more and more preferably 70% by mass or more based on the total amount of the primer layer E.

The primer layer E may further contain a silane coupling agent. When the primer layer E contains the silane coupling agent, the close adhesion between the primer layer E and the organic coating layer D can be easily improved. The silane coupling agent has a functional group at one end of the molecule thereof, usually a chloro, alkoxy, or acetoxy group or the like, and the functional group is hydrolyzed to form a silanol group (Si—OH), whereby the resin composition of the primer layer E is modified by a covalent bond or the like to form a strong bond. In addition, an organic functional group, such as vinyl, methacryloxy, amino-based, epoxy-based, or mercapto, at the other end of the silane coupling agent can easily improve the close adhesion between the primer layer E and the organic coating layer D and between the primer layer E and the quantum dot-containing layer.

Examples of the silane coupling agent include γ-chloropropyltrimethoxysilane, vinyltrichlorosilane, vinyltriethoxysilane, vinyl-tris(β-methoxyethoxy)silane, γ-methacryloxypropyltrimethoxysilane, β-(3,4-epoxycyclohexyl) ethyltrimethoxysilane, γ-glycidoxypropyltrimethoxysilane, vinyltriacetoxysilane, γ-mercaptopropyltrimethoxysilane, N-β(aminoethyl)-γ-aminopropyltrimethoxysilane, N-β(aminoethyl)-γ-aminopropylmethyldimethoxysilane, γ-ureidopropyltriethoxysilane, bis(β-hydroxyethyl)-γ-aminopropyltriethoxysilane, and γ-aminopropylsilicone, and one or two or more thereof can be used.

The content of the silane coupling agent is preferably 1% by mass or more and more preferably 3% by mass or more based on the total amount of the primer layer E. When the content of the silane coupling agent is in the above range, the close adhesion between the primer layer E and the organic coating layer D and between the primer layer E and the quantum dot-containing layer can be easily further improved.

For improving the extensibility of the primer layer E and suppressing the occurrence of a crack in the primer layer E, the content of the silane coupling agent is preferably 30% by mass or less and more preferably 20% by mass or less based on the total amount of the primer layer E.

The primer layer E may further include a filler. The filler has the role of adjusting the viscosity or the like of a coating liquid for forming a primer layer to improve the coating suitability or the like. As the filler, for example, calcium carbonate, barium sulfate, alumina white, silica, talc, a glass frit, or a resin powder can be used.

The primer layer may further include an additive such as a stabilizer, a crosslinking agent, a lubricant, or an ultraviolet absorber, as necessary.

<Physical Properties>
<<Oxygen Transmission Rate>>

The barrier film preferably has a value of oxygen transmission rate according to JIS K7126-2:2006 of 0.5 cc/m²·day·atm or less. The temperature and humidity conditions for measuring the oxygen transmission rate are 23° C. and a relative humidity of 90%. In addition, before measuring the oxygen transmission rate, a sample for measurement is exposed to an atmosphere having a temperature of 23° C.±5° C. and a relative humidity of 40% or more and 65% or less for 30 minutes or more.

The oxygen transmission rate can be measured, for example, using an oxygen transmission rate measuring apparatus (trade name: OX-TRAN) manufactured by MOCON, Inc (MOCON method).

<<b* Value>>

The barrier film has a b* value in the L*a*b* color system of preferably −1.3 or more and 1.0 or less, more preferably −1.5 or more and 0.8 or less, and further preferably −1.0 or more and 0.5 or less. The b* value is a b* value for transmission. The light coming-in surface when measuring the b* value is the surface of the opposite side from the light-transmitting base material.

The L*a*b* color system is based on the L*a*b* color system standardized by the International Commission on Illumination (CIE) in 1976 and is adopted in JIS Z8781-4: 2013.

<<Total Light Transmittance>>

The barrier film has a total light transmittance according to JIS K7361-1:1997 of preferably 80% or more, more preferably 85% or more, and further preferably 87% or more. The light coming-in surface when measuring the total light transmittance is the surface of the opposite side from the light-transmitting base material.

<Production Method>

The barrier film can be produced, for example, by forming the inorganic oxide layer and the organic coating layer on the light-transmitting base material. When the barrier film having a primer layer is produced, the primer layer may further be formed.

As described above, the inorganic oxide layer can be formed by a physical vapor deposition method such as a vacuum vapor deposition method, a chemical vapor deposition method such as a plasma chemical vapor deposition method, or the like.

The organic coating layer and the primer layer can each be formed by applying, drying, and as necessary curing a coating liquid in which a composition for constituting the layer is dissolved or dispersed.

<Applications>

The barrier film for a wavelength conversion sheet according to the present disclosure can be used, for example, as a barrier film for a wavelength conversion sheet of a surface light source. Examples of the surface light source include a backlight light source of a liquid crystal display device and a backlight light source of an inspection device. That is, the barrier film for a wavelength conversion sheet according to the present disclosure can be used as a "barrier film for a wavelength conversion sheet of a backlight light source of a liquid crystal display device," a "barrier film for a wavelength conversion sheet of a backlight light source of an inspection device," or the like.

Further, the barrier film for a wavelength conversion sheet according to the present disclosure can also be used as a "barrier film for a wavelength conversion sheet for horticulture." Examples of the wavelength conversion sheet for horticulture include a sheet having the function of converting an ultraviolet ray into a wavelength suitable for plant growth. Examples of the wavelength suitable for plant growth include a wavelength suitable for photosynthesis. The wavelength conversion sheet for horticulture can be installed, for example, on a ceiling or the like of a horticultural facility such as a plastic greenhouse and a glasshouse.

[Wavelength Conversion Sheet]

The wavelength conversion sheet of the present disclosure is a wavelength conversion sheet including a quantum dot-containing layer including a quantum dot and barrier films respectively laminated on both sides of the quantum dot-containing layer, wherein the barrier film is the barrier film of the present disclosure described above and is laminated such that the surface of the opposite side of the barrier film from the light-transmitting base material faces a side of the quantum dot-containing layer.

FIG. 4 to FIG. 6 are each a cross-sectional view showing an embodiment of a wavelength conversion sheet (200) of the present disclosure. The wavelength conversion sheet (200) of each of FIG. 4 to FIG. 6 has a quantum dot-containing layer (50) including a quantum dot and barrier films (100*a*, 100*b*) laminated on both sides, respectively, of the quantum dot-containing layer. In addition, in the wavelength conversion sheet (200) of each of FIG. 4 to FIG. 6, the barrier films are laminated such that the surface of the opposite side of each of the barrier films (100*a*, 100*b*) from a light-transmitting base material (10) faces the side of the quantum dot-containing layer (50).

As shown in FIG. 4 to FIG. 6, the wavelength conversion sheet preferably has a vertically symmetrical configuration centered on the quantum dot-containing layer. In other words, it is preferable to use barrier films having the same configuration as the barrier films respectively laminated on both sides of the quantum dot-containing layer. Due to the above configuration, the strain can be evenly dispersed so that the flatness of the wavelength conversion sheet can be easily improved, and the close adhesion of each interface of the wavelength conversion sheet can also be easily improved.

<Quantum Dot-Containing Layer>

The quantum dot-containing layer includes a quantum dot and a binder resin.

The quantum dot is a nanometer-sized file particle of a semiconductor, exhibits a specific optical or electrical nature due to the quantum confinement effect (quantum size effect), the effect of confining an electron or an exciton in a small nanometer-sized crystal, and is also referred to as a semiconductor nanoparticle or a semiconductor nanocrystal.

The quantum dot is not particularly limited as long as it is a nanometer-sized fine particle of a semiconductor and is a material that generates the quantum confinement effect (quantum size effect). Examples of the quantum dot include a semiconductor fine particle whose emission color is regulated by its own particle size and a semiconductor fine particle having a dopant.

Quantum dots have different emission colors depending on the particle sizes thereof, and for example, in the case of quantum dots constituted only by a core made of CdSe, the peak wavelengths of fluorescence spectra when the particle sizes are 2.3 nm, 3.0 nm, 3.8 nm, and 4.6 nm are 528 nm, 570 nm, 592 nm, and 637 nm, respectively. That is, the particle size of the quantum dot that emits secondary light having a peak wavelength of 637 nm is 4.6 nm, and the particle size of the quantum dot that emits secondary light having a peak wavelength of 528 nm is 2.3 nm.

The quantum dots preferably include one or more selected from the group consisting of a quantum dot that emits secondary light having a wavelength corresponding to red and a quantum dot that emits secondary light having a wavelength corresponding to green, and more preferably include a quantum dot that emits secondary light having a wavelength corresponding to red and a quantum dot that emits secondary light having a wavelength corresponding to green.

The quantum dots may contain a quantum dot other than the quantum dot that emits secondary light having a wavelength corresponding to red or the quantum dot that emits secondary light having a wavelength corresponding to green.

The quantum dot content is appropriately adjusted according to the thickness of the quantum dot-containing layer, the recycling rate of light in the backlight, the target color, or the like. If the thickness of the quantum dot-containing layer is in the range described later, the quantum dot content is about 0.01 parts by mass or more and 1.0 part by mass or less per 100 parts by mass of the binder resin of the quantum dot-containing layer.

Specific examples of a material that forms the core of the quantum dot include a semiconductor crystal containing a semiconductor compound or a semiconductor such as a group II-VI semiconductor compound such as MgS, MgSe, MgTe, CaS, CaSe, CaTe, SrS, SrSe, SrTe, BaS, BaSe, BaTe, ZnS, ZnSe, ZnTe, CdS, CdSe, CdTe, HgS, HgSe, and HgTe, a group III-V semiconductor compound such as AlN, AlP, AlAs, AlSb, GaAs, GaP, GaN, GaSb, InN, InAs, InP, InSb, TiN, TiP, TiAs, and TiSb, or a group IV semiconductor such as Si, Ge, and Pb. A semiconductor crystal including a semiconductor compound including three or more elements such as InGaP can also be used.

Further, as a quantum dot composed of a semiconductor fine particle having a dopant, a semiconductor crystal can be used that is formed by doping the above semiconductor compound with a cation of a rare earth metal or a cation of a transition metal, such as $Eu^{3+}$, $Tb^{3+}$, $Ag^+$, or $Cu^+$.

A semiconductor crystal such as CdS, CdSe, CdTe, InP, or InGaP is suitable as a material that forms the core of the quantum dot in view of ease of preparation, controllability of particle size that can provide light emission in the visible range, and fluorescence quantum yield.

The quantum dot may be made of one semiconductor compound or two or more semiconductor compounds, and for example, may have a core-shell type structure having a core made of a semiconductor compound and a shell made of a semiconductor compound different from that of the core.

When the core-shell type quantum dot is used, a material having a bandgap higher than that of the semiconductor compound that forms the core can be used as the semiconductor that forms the shell so that an exciton is confined in the core, whereby the light emission efficiency of the quantum dot can be enhanced.

Examples of the core-shell structure (core/shell) having such a bandgap magnitude relationship include CdSe/ZnS, CdSe/ZnSe, CdSe/CdS, CdTe/CdS, InP/ZnS, Gap/ZnS, Si/ZnS, InN/GaN, InP/CdSSe, InP/ZnSeTe, InGaP/ZnSe, InGaP/ZnS, Si/AlP, InP/ZnSTe, InGaP/ZnSTe, and InGaP/ZnSSe.

The size of the quantum dot may be appropriately controlled by the material that constitutes the quantum dot so that light having a desired wavelength can be obtained. As the particle size of the quantum dot decreases, the energy bandgap increases. Specifically, as the crystal size decreases, the light emission of the quantum dot shifts to the blue side, that is, to the high energy side. Accordingly, by changing the size of the quantum dot, the emission wavelength thereof can be regulated over the entire spectral wavelength region of the ultraviolet region, the visible region, and the infrared region.

In general, the particle size (diameter) of the quantum dot is preferably in the range of 0.5 nm or more and 20 nm or less and particularly preferably in the range of 1 nm or more and 10 nm or less. A narrower size distribution of the quantum dot can provide a clearer emission color.

The shape of the quantum dot is not particularly limited, and may be, for example, a spherical shape, a rod shape, a disk shape, or any other shape. When the particle dot is not in a spherical shape, the particle size of the quantum dot can be a value of a truly spherical shape having the same volume.

The quantum dot may be coated with a resin.

Examples of the binder resin of the quantum dot-containing layer include a thermoplastic resin, a cured product of a thermosetting resin composition, and a cured product of an ionizing radiation curable resin composition. Among these, in view of durability, a cured product of a thermosetting resin composition and a cured product of an ionizing radiation curable resin composition are preferable, and a cured product of an ionizing radiation curable resin composition is more preferable.

The thermosetting resin composition is a composition including at least a thermosetting resin, and is a resin composition that is cured by heating. The thermosetting resin composition includes preferably a thiol compound and more preferably a polyfunctional thiol compound, which are described later, in addition to the thermosetting resin.

Examples of the thermosetting resin include an acrylic resin, a urethane resin, a phenol resin, a urea melamine resin, an epoxy resin, an unsaturated polyester resin, and a silicone resin. In the thermosetting resin composition, a curing agent is added, as necessary, to these curable resins.

The ionizing radiation curable resin composition is a composition including a compound having an ionizing radiation curable functional group (hereinafter, also referred to as an "ionizing radiation curable compound"). The ionizing radiation curable resin composition includes preferably a thiol compound and more preferably a polyfunctional thiol compound, which are described later, in addition to the ionizing radiation curable compound.

Examples of the ionizing radiation curable functional group include an ethylenically unsaturated bond group such as a (meth)acryloyl group, a vinyl group, or an allyl group, an epoxy group, and an oxetanyl group, and among these, an ethylenically unsaturated bond group is preferable. Among the ethylenically unsaturated bond groups, a (meth)acrylate group is preferable. Hereinafter, the ionizing radiation curable compound having a (meth)acryloyl group is referred to as a (meth)acrylate-based compound. That is, the binder resin preferably includes a cured product of a composition including a (meth)acrylate-based compound.

As used herein, "(meth)acrylate" refers to methacrylate and acrylate. As used herein, "ionizing radiation" means an electromagnetic wave or a charged particle beam having an energy quantum that can polymerize or crosslink a molecule among electromagnetic waves or charged particle beams, and usually, an ultraviolet ray or an electron beam is used. An electromagnetic wave such as an X-ray or a γ-ray, and a charged particle beam such as an α-ray or an ion beam can also be used.

The ionizing radiation curable compound may be a monofunctional ionizing radiation curable compound having only one such functional group, a polyfunctional ionizing radiation curable compound having two or more such functional groups, or a mixture thereof. Among these, a polyfunctional ionizing radiation curable compound is preferable, and a polyfunctional (meth)acrylate-based compound having two or more (meth)acryloyl groups is more preferable. That is, the binder resin includes preferably a cured product of a polyfunctional ionizing radiation curable compound and more preferably a cured product of a polyfunctional (meth)acrylate-based compound. Further, the binder resin includes preferably a cured product of a composition including a polyfunctional ionizing radiation curable compound and a thiol compound and more preferably a cured product of a composition including a polyfunctional (meth)acrylate-based compound and a thiol compound.

The polyfunctional (meth)acrylate-based compound may have an alkyleneoxy group.

As the alkyleneoxy group, for example, an alkyleneoxy group having 2 or more and 4 or less carbon atoms is preferable, an alkyleneoxy group having 2 or 3 carbon atoms is more preferable, and an alkyleneoxy group having 2 carbon atoms is further preferable.

The polyfunctional (meth)acrylate-based compound having an alkyleneoxy group may be a polyfunctional (meth)acrylate-based compound having a polyalkyleneoxy group including a plurality of alkyleneoxy groups.

When the polyfunctional (meth)acrylate-based compound has an alkyleneoxy group, the number of alkyleneoxy groups in one molecule is preferably 2 or more and 30 or less, and more preferably 2 or more and 20 or less, further preferably 3 or more and 10 or less, and more further preferably 3 or more and 5 or less.

When the polyfunctional (meth)acrylate-based compound has an alkyleneoxy group, the compound preferably has a bisphenol structure. This tends to improve the heat resistance of the cured product. Examples of the bisphenol structure include a bisphenol A structure and a bisphenol F structure, and among these, a bisphenol A structure is preferable.

As the polyfunctional (meth)acrylate-based compound having an alkyleneoxy group, above all, ethoxylated bisphenol A type di(meth)acrylate, propoxylated bisphenol A type di(meth)acrylate, and propoxylated ethoxylated bisphenol A type di(meth)acrylate are preferable, and ethoxylated bisphenol A type di(meth)acrylate is more preferable.

The ionizing radiation curable compound may be a monomer, an oligomer, a low molecular weight polymer, or a mixture thereof.

As described above, the thermosetting resin composition and the ionizing radiation curable resin composition preferably include a thiol compound.

The thiol compound is a compound having one or more units represented by R—SH wherein R is an organic group. As used herein, a compound having one unit represented by R—SH is referred to as a monofunctional thiol compound, and a compound having two or more units represented by R—SH is referred to as a polyfunctional thiol compound.

The thiol compound may be a monofunctional thiol compound, but a polyfunctional thiol compound is preferable in view of improving the strength of the quantum dot-containing layer. Among the polyfunctional thiol compounds, a trifunctional thiol compound or a tetrafunctional thiol compound is more preferable.

The thiol compound causes a thiol-ene reaction of the following equation with a compound having a radically polymerizable functional group in the presence of a radical polymerization initiator. The thiol-ene reaction is preferable in the following: because the thiol-ene reaction can suppress polymerization shrinkage, the stress generated at the time of curing the quantum dot-containing layer is relaxed, and as a result, the interlayer close adhesion of the wavelength conversion sheet is easily further improved. In addition, the cured product obtained by the thiol-ene reaction is preferable in that the heat resistance is easily improved. Further, the refractive index of the thiol compound (about 1.53) is higher than the refractive index of the polyfunctional (meth)acrylate-based compound (about 1.45), and thus the degree of freedom in adjusting the refractive index of the quantum dot-containing layer can be increased.

The following reaction is an example of a reaction between a monofunctional thiol compound and a compound having one radically polymerizable functional group. It is considered that the reaction product of a polyfunctional thiol compound and a compound having two or more radically polymerizable functional groups easily forms a dendrimer structure. Then, it is considered that when the dendrimer structure is formed, the flexibility of the quantum dot-containing layer increases, and that the quantum dot-containing layer itself easily exerts an excellent stress relaxation property. Examples of the radically polymerizable functional group include an ethylenically unsaturated bond-containing group such as a (meth)acryloyl group, a vinyl group, or an allyl group.

[Formula 1]

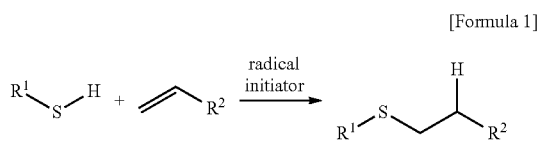

wherein $R^1$ and $R^2$ are organic groups.

Specific examples of the monofunctional thiol compound include hexanethiol, 1-heptanethiol, 1-octanethiol, 1-nonanethiol, 1-decanethiol, 3-mercaptopropionic acid, methyl mercaptopropionate, methoxybutyl mercaptopropionate, octyl mercaptopropionate, tridecyl mercaptopropionate, 2-ethylhexyl-3-mercaptopropionate, and n-octyl-3-mercaptopropionate.

Specific examples of the polyfunctional thiol compound include ethylene glycol bis(3-mercaptopropionate), diethylene glycol bis(3-mercaptopropionate), tetraethylene glycol bis(3-mercaptopropionate), 1,2-propylene glycol bis(3-mercaptopropionate), diethylene glycol bis(3-mercaptobutyrate), 1,4-butanediol bis(3-mercaptopropionate), 1,4-butanediol bis(3-mercaptobutyrate), 1,8-octanediol bis(3-mercaptopropionate), 1,8-octanediol bis(3-mercaptobutyrate), hexanediol bisthioglycolate, trimethylolpropane tris(3-mercaptopropionate), trimethylolpropane tris(3-mercaptobutyrate), trimethylolpropane tris(3-mercaptoisobutyrate), trimethylolpropane tris(2-mercaptoisobutyrate), trimethylolpropane tristhioglycolate, tris-[(3-mercaptopropionyloxy)-ethyl]-isocyanurate, trimethylolethane tris(3-mercaptobutyrate), pentaerythritol tetrakis(3-mercaptopropionate), pentaerythritol tetrakis(3-mercaptobutyrate), pentaerythritol tetrakis(3-mercaptoisobutyrate), pentaerythritol tetrakis(2-mercaptoisobutyrate), dipentaerythritol hexakis(3-mercaptopropionate), dipentaerythritol hexakis(2-mercaptopropionate), dipentaerythritol hexakis(3-mercaptobutyrate), dipentaerythritol hexakis(3-mercaptoisobutyrate), dipentaerythritol hexakis(2-mercaptoisobutyrate), pentaerythritol tetrakisthioglycolate, and dipentaerythritol hexakisthioglycolate.

In the ionizing radiation curable resin composition (or thermosetting resin resin composition), the mass ratio of the ionizing radiation curable compound (or thermosetting resin) to the thiol compound is preferably 80:20 to 35:65 and more preferably 70:30 to 40:60.

When the ionizing radiation curable compound is an ultraviolet curable compound, the ionizing radiation curable composition preferably includes an additive such as a photopolymerization initiator or a photopolymerization accelerator.

The quantum dot-containing layer may include an internal diffusion particle.

As the internal diffusion particle, either of an organic particle and an inorganic particle can be used. Examples of the organic particle include a particle made of polymethyl methacrylate, an acrylic-styrene copolymer, a melamine resin, a polycarbonate, a polystyrene, polyvinyl chloride, a benzoguanamine-melamine-formaldehyde condensate, a silicone resin, a fluororesin, a polyester, or the like. Examples of the inorganic fine particle include a fine particle made of silica, alumina, zirconia, titania, or the like.

Examples of the shape of the internal diffusion particle include a spherical shape, a disk shape, a rugby ball shape, and an irregular shape. The internal diffusion particle may be any of a hollow particle, a porous particle, and a solid particle.

The content of the internal diffusion particle is preferably 1 part by mass or more and 40 parts by mass or less and more preferably 3 parts by mass or more and 30 parts by mass or less per 100 parts by mass of the binder resin.

The average particle size of the internal diffusion particle is preferably 1 μm or more and 7 μm or less and more preferably 1 μm or more and 3 μm or less.

The thickness of the quantum dot-containing layer is preferably 10 μm or more and 200 μm or less, more preferably 20 μm or more and 150 μm or less, and further preferably 30 μm or more and 130 μm or less.

The refractive index $n_Z$ of the quantum dot-containing layer is preferably 1.40 or more and 1.55 or less, more preferably 1.43 or more and 1.52 or less, and further preferably 1.46 or more and 1.50 or less. When the refractive index $n_Z$ of the quantum dot-containing layer is in the above range, the interface between the quantum dot-containing layer and the barrier film is likely to be fixed end reflection. (In the measurement of the spectral transmittance of the barrier film of the present disclosure, the reflection at the interface between air and the barrier film is fixed end reflection. Therefore, the interface between the quantum dot-containing layer and the barrier film is preferably fixed end reflection.)

The refractive index $n_Z$ of the quantum dot-containing layer is mostly governed by the refractive index of the binder resin. The reason for this is as follows: the quantum dot-containing layer has a low quantum dot content, and even if an internal diffusion agent is contained, the internal diffusion agent has a particle size larger than the wavelength of light and does not affect the refractive index of the layer.

[Backlight]

The backlight of the present disclosure is a backlight including: at least one light source that emits primary light; an optical plate that is disposed adjacent to the light source and is for light guiding or diffusion; and a wavelength conversion sheet disposed on a light going-out side of the optical plate, wherein the wavelength conversion sheet is the wavelength conversion sheet of the present disclosure described above.

Examples of a backlight 300 of the present disclosure include an edge-lit type backlight 301 as shown in FIG. 7 and a direct-lit type backlight 302 as shown in FIG. 8.

An optical plate 220 used for the edge-lit type backlight 301 in FIG. 7 is an optical member for guiding primary light emitted by a light source 210, and is a so-called light guide plate 221. The light guide plate 221 has, for example, a substantially flat plate shape configured to have at least one surface as a light coming-in surface and one surface substantially orthogonal to the light coming-in surface as a light going-out surface.

The light guide plate is mainly made of a matrix resin selected from the group consisting of a highly transparent resin such as polymethyl methacrylate. A resin particle having a refractive index different from that of the matrix resin may be added, as necessary, to the light guide plate. Each surface of the light guide plate may have a complicated surface shape instead of a uniform flat surface, and may be provided with a dot pattern or the like.

The optical plate 220 used for the direct-lit type backlight 302 of FIG. 8 is an optical member (light diffusing plate 222) having a light diffusing property for making the pattern of the light source 210 less visible. Examples of the light diffusing plate 222 include a milky white resin plate having a thickness of about 1 mm or more and 3 mm or less.

In addition to the light source, the optical plate, and the barrier film described above, the edge-lit type and direct-lit type backlights may include one or more members selected from the group consisting of a reflector, a light diffusing film, a prism sheet, a brightness enhancement film (BEF), a reflective polarizing film (DBEF), and the like, depending on the purpose.

The reflector is disposed on the opposite side of the optical plate from the light going-out surface side. The light diffusing film, the prism sheet, the brightness enhancement film, and the reflective polarizing film are disposed on the light going-out surface side of the optical plate. A backlight having an excellent balance of front brightness, viewing angle, and the like can be provided when the backlight is configured to include one or more members selected from the group consisting of a reflector, a light diffusing film, a prism sheet, a brightness enhancement film, a reflective polarizing film, and the like.

In the edge-lit type and direct-lit type backlights, the light source 210 is a light emitting body that emits primary light, and it is preferable to use a light emitting body that emits primary light having a wavelength corresponding to blue. The primary light having a wavelength corresponding to blue preferably has a peak wavelength in the range of 380 nm or more and 480 nm or less. The peak wavelength is more preferably in the range of 450 nm±7 nm, more preferably in the range of 450 nm±5 nm, more preferably in the range of 450 nm±3 nm, and more preferably in the range of 450 nm±1 nm.

The light source 210 is preferably an LED light source and more preferably a blue monochromatic LED light source, in view of simplifying and downsizing the apparatus in which the backlight is installed. The number of the light source 210 is at least one, and it is preferable to provide a plurality thereof in view of emitting sufficient primary light.

In the backlight including the wavelength conversion sheet, the difference in x value ($\Delta x$) and the difference in y value ($\Delta y$) between before and after the following high temperature and high humidity test in the Yxy color system of the International Commission on Illumination (CIE) are each preferably 0.020 or less and more preferably 0.010 or less. By setting each of $\Delta x$ and $\Delta y$ to 0.020 or less, the change in color can be suppressed.

High temperature and high humidity test: A test involving exposure to an atmosphere having 60° C. and a relative humidity of 90% for 1000 hours.

The x and y values after the high temperature and high humidity test are measured in an atmosphere having a temperature of 23° C.±5° C. and a relative humidity of 40% or more and 65% or less immediately after the measurement sample is taken out from the environment of the high temperature and high humidity test.

[Liquid Crystal Display Device]

The liquid crystal display device of the present disclosure is a liquid crystal display device including a backlight and a liquid crystal panel, wherein the backlight is the backlight of the present disclosure described above.

The liquid crystal panel is not particularly limited, and a general-purpose liquid crystal panel can be used as the liquid crystal panel of the liquid crystal display device. For example, a liquid crystal panel having a general structure can be used in which the liquid crystal layer is sandwiched between glass plates on the upper side and the lower side, respectively, thereof, specifically, a liquid crystal panel using a display mode such as TN, STN, VA, IPS, and OCB.

The liquid crystal display device further includes a polarizing plate, a color filter, and the like. A general-purpose polarizing plate and color filter can be used.

The display image of the liquid crystal display device is displayed in color by the white light emitted from the backlight penetrating the color filter. The liquid crystal display device, in which a color filter that matches the spectrum of a backlight using a quantum dot is used, can realize a display that is excellent in brightness and efficiency and produces a very clear color.

[Method for Selecting Barrier Film]

The method for selecting a barrier film for a wavelength conversion sheet according to the present disclosure is a method for selecting a barrier film having at least one inorganic oxide layer and at least one organic coating layer on one surface of a light-transmitting base material, the barrier film satisfying the following criteria 1 and 2.

<Criterion 1>

A value of a water vapor transmission rate of the barrier film according to JIS K7129-2:2019 is 0.20 g/m$^2$·day or less;

<Criterion 2>

When a spectral transmittance of the barrier film is measured with a surface of a side having the inorganic oxide layer and the organic coating layer as a light coming-in surface, the spectral transmittance measured has a spectral transmittance bottom at which the spectral transmittance changes from decreasing to increasing, or a spectral transmittance peak at which the spectral transmittance changes from increasing to decreasing, in the range of 450 nm±7 nm.

By selecting a barrier film satisfying criteria 1 and 2, it is possible to efficiently select a barrier film for a wavelength conversion sheet that can suppress a change in color.

Suitable embodiments of criterion 1 and criterion 2 are according to the suitable embodiments of the barrier film of the present disclosure described above.

For example, for criterion 1, the value of the water vapor transmission rate is preferably 0.17 g/m²·day or less, more preferably 0.15 g/m²·day or less, and further preferably 0.13 g/m²·day or less.

In addition, for criterion 2, the position of the peak or the bottom is more preferably in the range of 450 nm±5 nm, further preferably in the range of 450 nm±3 nm, and more further preferably in the range of 450 nm±1 nm.

In addition, the method for selecting a barrier film according to the present disclosure preferably further has an additional determination condition. Examples of the additional determination condition include the embodiments given as the suitable embodiments of the barrier film of the present disclosure described above.

Specific examples of the additional determination condition include the following. That is, the method for selecting a barrier film according to the present disclosure preferably has one or more selected from the group consisting of the following additional determination conditions.

<Additional Determination Condition 1>

The peak or the bottom is a peak at which the spectral transmittance changes from increasing to decreasing.

<Additional Determination Condition 2>

The peak or the bottom is a peak at which the spectral transmittance changes from increasing to decreasing, and the barrier film has a spectral transmittance peak at 450 nm or more and 457 nm or less.

<Additional Determination Condition 3>

The peak or the bottom is a bottom at which the spectral transmittance changes from decreasing to increasing, and the barrier film has a spectral transmittance bottom at 443 nm or more and 450 nm or less.

<Additional Determination Condition 4>

The barrier film has a value of an oxygen transmission rate according to JIS K7126-2:2006 of 0.5 cc/m²·day·atm or less.

<Additional Determination Condition 5>

The barrier film has a b* value in the L*a*b* color system of −1.3 or more and 1.0 or less.

<Additional Determination Condition 6>

The barrier film has a total light transmittance according to JIS K7361-1:1997 of 80% or more.

EXAMPLES

Next, the present disclosure will be described in more detail with reference to Examples, but the present disclosure is not limited to these Examples at all. "Parts" and "%" are by mass unless otherwise specified.

1. Measurements and Evaluations

The following measurements and evaluations of the barrier films or wavelength conversion sheets of Examples and Comparative Examples were carried out. Results thereof are shown in Table 1 or 2.

1-1. Water Vapor Transmission Rate

A value of the water vapor transmission rate according to JIS K7129-2:2019 of each of the barrier films of the Examples and the Comparative Examples was measured. As the measuring apparatus, the trade name "PERMATRAN" manufactured by MOCON, Inc. was used. The temperature and humidity conditions for measuring the water vapor transmission rate were 40° C. and a relative humidity of 90%. Before measuring the water vapor transmission rate, a sample for measurement was exposed to an atmosphere having a temperature of 23° C.±5° C. and a relative humidity of 40% or more and 65% or less for 30 minutes or more. The water vapor transmission rate thus measured means the water vapor transmission rate in the initial stage. A sample having a water vapor transmission rate of 0.20 g/m²·day or less is at an acceptable level.

1-2. Total Light Transmittance

The total light transmittance of each of the barrier films of the Examples and the Comparative Examples was measured. The light coming-in surface was the surface of the opposite side from the light-transmitting base material. As the measuring apparatus, a haze meter (HM-150, manufactured by Murakami Color Research Laboratory Co., Ltd.) was used. A sample having a total light transmittance of 85% or more is at an acceptable level.

The total light transmittance was measured in an atmosphere having a temperature of 23° C.±5° C. and a relative humidity of 40% or more and 65% or less. Each sample was exposed to the atmosphere for 30 minutes or more before the measurement. The total light transmittance thus measured means the total light transmittance in the initial stage.

1-3. b* Value

The b* value (b* value for transmission) of the L*a*b* color system of each of the barrier films of the Examples and the Comparative Examples was measured. The light coming-in surface was the surface of the opposite side from the light-transmitting base material. As the measuring apparatus, a spectrophotometer (trade name: V670) manufactured by JASCO Corporation was used. A sample having a b* value of 1.0 or less is at an acceptable level.

The b* value was measured in an atmosphere having a temperature of 23° C.±5° C. and a relative humidity of 40% or more and 65% or less. Each sample was exposed to the atmosphere for 30 minutes or more before the measurement. The b* value thus measured means the b* value in the initial stage.

1-4. Spectral Transmittance

The spectral transmittance at a wavelength of 380 nm or more and 780 nm or less of each of the barrier films of the Examples and the Comparative Examples was measured, and the surface of the opposite side from the light-transmitting base material was the light coming-in surface (measurement wavelength interval; 1 nm). As the measuring apparatus, a spectrophotometer (trade name: V670) manufactured by JASCO Corporation was used, and the following were used as accessory units or the like.

Accessory unit: Integrating sphere unit (manufactured by JASCO Corporation, product number: ISN-723)

Light sources: Deuterium lamp (190 nm or more and 350 nm or less), halogen lamp (330 nm or more and 2700 nm or less)

Measurement spot diameter: 2 mm or more and 20 mm or less

Based on the measurement results, the position of the peak or the bottom closest to 450 nm of the spectral transmittance of the barrier film of each of the Examples and the Comparative Examples was calculated. Results thereof are shown in Table 1 or 2. In addition, whether the peak or the bottom is either a peak or a bottom is also shown in Table 1 or 2. For a barrier film in which the peak or the bottom closest to 450 nm was a bottom, the position of the peak closest to 450 nm is also shown in Table 1 or 2.

In addition, the spectral transmittance of the barrier film of Example 1 is shown in FIG. 9, and the spectral transmittance of the barrier film of Comparative Example 1 is shown in FIG. 10. In FIG. 9 and FIG. 10, the horizontal axis represents the wavelength (in units of "nm"), and the vertical axis represents the transmittance ("%").

The spectral transmittance was measured in an atmosphere having a temperature of 23° C.±5° C. and a relative humidity of 40% or more and 65% or less. Each sample was exposed to the atmosphere for 30 minutes or more before the measurement. The spectral transmittance thus measured means the spectral transmittance in the initial stage.

1-5. Δx and Δy

<Provision of Direct-Lit Type Backlight for Measurement>

A commercially available liquid crystal display television (manufactured by VIZIO, Inc., PQ65-F1) equipped with a direct-lit type backlight was disassembled, and the direct-lit type backlight was taken out. The direct-lit type backlight is equipped with a direct-lit type blue LED having an emission central wavelength of 450 nm and a full width at half maximum of 20 nm as a light source. In addition, on the light going-out side of the light source, a light diffusing plate, a wavelength conversion sheet including a quantum dot-containing layer, a prism sheet, and a reflective polarizing plate (brightness enhancement film, manufactured by 3M, DBEF (registered trademark)) are disposed in presented order. In addition, a reflective sheet is provided on the opposite side of the light source from the light going-out side.

The wavelength conversion sheet in the direct-lit type backlight was changed to each of the wavelength conversion sheets of the Examples and the Comparative Examples to obtain a "direct-lit type backlight for measurement of an x value and a y value in the initial stage". Each of the wavelength conversion sheets of the Examples and the Comparative Examples was exposed to an atmosphere having a temperature of 23° C.±5° C. and a relative humidity of 40% or more and 65% or less for 30 minutes or more before being incorporated into the direct-lit type backlight.

The wavelength conversion sheet in the direct-lit type backlight was changed to each of the wavelength conversion sheets of the Examples and the Comparative Examples for which a high temperature and high humidity test (a test involving exposure to an atmosphere of 60° C. and a relative humidity of 90% for 1000 hours) had been carried out, to obtain a "direct-lit type backlight for measurement of an x value and a y value after the high temperature and high humidity test." The work of incorporating each of the wavelength conversion sheets of the Examples and the Comparative Examples for which the high temperature and high humidity test had been carried out into the direct-lit type backlight was carried out quickly in an atmosphere having a temperature of 23° C.±5° C. and a relative humidity of 40% or more and 65% or less.

Then, the measurement was carried out for the direct-lit type backlight for measurement described above in the following measurement environment.

<x Value and y Value in Initial Stage>

The direct-lit type backlight for measurement of an x value and a y value in the initial stage was turned on, and an x value and a y value of the Yxy color system of the International Commission on Illumination (CIE) were measured from the front direction 500 mm away therefrom in a dark room environment. The measurement atmosphere was at a temperature of 23° C.±5° C. and a relative humidity of 40% or more and 65% or less. Each sample was exposed to the atmosphere for 30 minutes or more before the measurement. As the measuring apparatus, a spectroradiometer (trade name: SR-3AR) manufactured by Topcon Technohouse Corporation was used.

<x Value and y Value after High Temperature and High Humidity Test>

The direct-lit type backlight for measurement of an x value and a y value after the high temperature and high humidity test was turned on, and an x value and a y value of the Yxy color system of the International Commission on Illumination (CIE) were measured from the front direction 500 mm away therefrom in a dark room environment. The measurement atmosphere was at a temperature of 23° C.±5° C. and a relative humidity of 40% or more and 65% or less. As the measuring apparatus, a spectroradiometer (trade name: SR-3AR) manufactured by Topcon Technohouse Corporation was used.

<Δx and Δy>

The difference between the x value in the initial stage and the x value after the high temperature and high humidity test (Δx) and the difference between the y value in the initial stage and the y value after the high temperature and high humidity test (Δy) were calculated. A sample in which the Δx and the Δy are each 0.020 or less is at an acceptable level.

2. Preparation of Quantum Dot Dispersion Liquid

A quantum dot and amino-modified silicone were mixed at the composition ratio shown below in a glove box purged with nitrogen such that the oxygen concentration was 300 ppm or less, and the resulting mixture was stirred using a magnetic stirrer for 4 hours while heated in a water bath at 90° C. Thereafter, the mixture was filtered through a polypropylene filter having a pore size of 0.2 μm to obtain a CdSe/ZnS core-shell type quantum dot dispersion liquid.

Quantum dot 0.9 parts by mass
(Emission peak: 540 nm, serial number: 748056, manufactured by Sigma-Aldrich Corporation)
Quantum dot 0.9 parts by mass
(Emission peak: 630 nm, serial number: 790206, manufactured by Sigma-Aldrich Corporation)
Amino-modified silicone 99 parts by mass
(Manufactured by Genesee Polymers Corporation, product number: GP-344, viscosity: 670 mPa·s)

3. Preparation of Barrier Film and Preparation of Wavelength Conversion Sheet

Example 1

Aluminum oxide is vapor-deposited on one surface of a biaxially stretched PET film (refractive index no: 1.636, thickness $t_0$: 12 μm) by a vacuum vapor deposition method to form an inorganic oxide layer A (refractive index $n_A$: 1.77, thickness $t_A$: 8 nm).

Next, the following coating liquid for organic coating layer formation was applied onto the inorganic oxide layer A by gravure printing and heat-treated at 180° C. for 60 seconds to form an organic coating layer B (refractive index $n_B$: 1.55, thickness $t_B$: 251 nm).

Next, aluminum oxide was vapor-deposited on the organic coating layer B by a vacuum vapor deposition method to form an inorganic oxide layer C (refractive index $n_C$: 1.77, thickness $t_C$: 8 nm).

Next, the following coating liquid for organic coating layer formation was applied onto the inorganic oxide layer C by gravure printing and heat-treated at 180° C. for 60 seconds to form an organic coating layer D (refractive index $n_D$: 1.55, thickness $t_D$: 251 nm).

Next, the following coating liquid for primer layer formation was applied onto the organic coating layer D by gravure printing and heat-treated at 80° C. for 60 seconds to form a primer layer E (refractive index $n_E$: 1.575, thickness $t_E$: 143 nm), thereby obtaining the barrier film of Example 1. Two barrier films having the same configuration were prepared.

<Preparation of Coating Liquid for Organic Coating Layer Formation>

Tetraethoxysilane was mixed into a solution (pH 2.2) obtained by mixing water, isopropyl alcohol, and 0.5 N hydrochloric acid, while cooling the solution to 10° C., to thereby prepare solution A. Separately, polyvinyl alcohol and isopropyl alcohol having a saponification value of 99% or more were mixed to thereby prepare solution B. Solution A and solution B were mixed to prepare a coating liquid for organic coating layer formation (solid content: 5% by mass). The mass ratio of tetraethoxysilane to polyvinyl alcohol in the coating liquid for organic coating layer formation is 29:4.

<Coating Liquid for Primer Layer Formation>

Polyester polyurethane polyol 50 parts by mass
(Hydroxyl value: 62 mgKOH/g, solid content: 20% by mass)
Silane coupling agent 1 part by mass
(3-Glycidoxypropylmethyldimethoxysilane)
Silica filler 1 part by mass
(Average particle size 5 μm)
Curing agent 1 part by mass
(1,6-Hexamethylene diisocyanate, solid content 35%)
Solvent 50 parts by mass
(Methyl ethyl ketone)

A coating liquid for a quantum dot-containing layer having the following formulation was applied onto the surface of the primer layer side of one of the two barrier films prepared above and dried to form a quantum dot-containing layer not irradiated with ionizing radiation, thereby obtaining a laminated body A.

Next, the laminated body A and the other barrier film were laminated such that the surface of the side of the quantum dot-containing layer not irradiated with ionizing radiation of the laminated body A and the surface of the primer layer side of the other barrier film face each other, and then irradiated with an ultraviolet ray to allow the curing of the ionizing radiation curable resin composition of the quantum dot-containing layer to proceed, thereby obtaining a wavelength conversion sheet of Example 1. The thickness of the quantum dot-containing layer is 100 μm, and the refractive index is 1.48.

<Coating Liquid for Quantum Dot-Containing Layer>

Polyfunctional acrylate-based compound 58.11 parts by mass
(Ethoxylated bisphenol A diacrylate; trade name "ABE-300" of Shin-Nakamura Chemical Co., Ltd.)
Polyfunctional thiol compound 38.74 parts by mass
(Pentaerythritol tetrakis(3-mercaptopropionate); trade name "PEMP" of SC Organic Chemical Co., Ltd.)
Photopolymerization initiator 0.5 parts by mass
(Trade name "Omnirad TPO H" of IGM Resins B.V.)
Quantum dot dispersion liquid prepared in "2" above 1.61 parts by mass
Acetic acid 0.79 parts by mass
Titanium oxide 0.25 parts by mass (Trade name "Ti-Pure R-706" of The Chemours company; particle size 0.36 μm)

Examples 2 to 8

Barrier films and wavelength conversion sheets of Examples 2 to 8 were obtained in the same manner as in Example 1 except that the thicknesses of the organic coating layer B and the organic coating layer D were changed to the values shown in Table 1.

Example 9

A barrier film and a wavelength conversion sheet of Example 9 was obtained in the same manner as in Example 1, except that the primer layer E was not formed on the organic coating layer D.

Example 10

A barrier film and a wavelength conversion sheet of Example 10 were obtained in the same manner as in Example 1 except that the inorganic oxide layer A and the inorganic oxide layer C were each changed to a vapor-deposited film of silicon oxide (refractive index: 1.457), and the thicknesses of the inorganic oxide layer A, the organic coating layer B, the inorganic oxide layer C, and the organic coating layer D were changed to the values shown in Table 1.

Comparative Examples 1 to 3 and 5

Barrier films and wavelength conversion sheets of Comparative Examples 1 to 3 and 5 were obtained in the same manner as in Example 1 except that the thicknesses of the inorganic oxide layer A, the organic coating layer B, the inorganic oxide layer C, and the organic coating layer D were changed to the values shown in Table 2.

Comparative Example 4

A barrier film and a wavelength conversion sheet of Comparative Example 4 were obtained in the same manner as in Example 1 except that the thickness of the organic coating layer B was changed to the value shown in Table 2, the primer layer E was formed on the organic coating layer B, and the inorganic oxide layer C and the organic coating layer D were not formed.

Comparative Example 6

A barrier film and a wavelength conversion sheet of Comparative Example 6 were obtained in the same manner as in Example 1, except that the inorganic oxide layer A and the inorganic oxide layer C were each changed to a vapor-deposited film of silicon oxide (refractive index: 1.457), and that the thicknesses of the inorganic oxide layer A, the organic coating layer B, the inorganic oxide layer C, and the organic coating layer D were changed to the values shown in Table 2.

TABLE 1

|  |  | Examples | | | | | | | | | |
|---|---|---|---|---|---|---|---|---|---|---|---|
|  |  | 1 | 2 | 3 | 4 | 5 | 6 | 7 | 8 | 9 | 10 |
| Thickness [nm] | Primer layer E | 143 | 143 | 143 | 143 | 143 | 143 | 143 | 143 | — | 143 |
|  | Organic coating layer D | 251 | 107 | 322 | 324 | 395 | 253 | 396 | 396 | 251 | 330 |
|  | Inorganic oxide layer C | 8 | 8 | 8 | 8 | 8 | 8 | 8 | 8 | 8 | 150 |
|  | Organic coating layer B | 251 | 107 | 180 | 324 | 253 | 395 | 396 | 320 | 251 | 330 |
|  | Inorganic oxide layer A | 8 | 8 | 8 | 8 | 8 | 8 | 8 | 8 | 8 | 150 |
|  | Material of inorganic oxide layers | AlOx | AlOx | AlOx | AlOx | AlOx | AlOx | AlOx | AlOx | AlOx | SiOx |
| Spectral transmittance | Position of peak or bottom closest to 450 nm [nm] | 450 | 449 | 448 | 449 | 451 | 451 | 450 | 447 | 450 | 450 |
|  | Whether the above position was that of peak or bottom | Peak | Peak | Peak | Peak | Peak | Peak | Peak | Bottom | Peak | Peak |
|  | Position of peak closest to 450 nm when the above position was that of bottom [nm] | — | — | — | — | — | — | — | 420 | — | — |
| Measurements and evaluations | Water vapor transmission rate [g/m$^2$ · day] | 0.10 | 0.15 | 0.10 | 0.10 | 0.10 | 0.10 | 0.10 | 0.10 | 0.10 | 0.10 |
|  | Total light transmittance [%] | 89.1 | 89.6 | 89.8 | 90.1 | 89.2 | 89.5 | 89.1 | 89.0 | 89.1 | 87.7 |
|  | b* value | −1.2 | −1.3 | 0.3 | 0.8 | −0.8 | −0.7 | −0.7 | −0.4 | −1.2 | −0.1 |
|  | Δx | −0.004 | −0.005 | −0.004 | −0.004 | −0.002 | −0.001 | −0.002 | 0.000 | 0.000 | 0.000 |
|  | Δy | −0.006 | −0.010 | −0.008 | −0.010 | −0.005 | −0.005 | −0.004 | −0.001 | 0.000 | 0.001 |

TABLE 2

|  |  | Comparative Examples | | | | | |
|---|---|---|---|---|---|---|---|
|  |  | 1 | 2 | 3 | 4 | 5 | 6 |
| Thickness [nm] | Primer layer E | 143 | 143 | 143 | 143 | 143 | 143 |
|  | Organic coating layer D | 500 | 36 | 508 | — | 218 | 180 |
|  | Inorganic oxide layer C | 15 | 8 | 8 | — | 8 | 30 |
|  | Organic coating layer B | 400 | 36 | 508 | 300 | 218 | 180 |
|  | Inorganic oxide layer A | 15 | 8 | 8 | 8 | 8 | 30 |
|  | Material of inorganic oxide layers | AlOx | AlOx | AlOx | AlOx | AlOx | SiOx |
| Spectral transmittance | Position of peak or bottom closest to 450 nm [nm] | 431 | 450 | 456 | 451 | 460 | 440 |
|  | Whether the above position was that of peak or bottom | Peak | Peak | Bottom | Bottom | Bottom | Bottom |
|  | Position of peak closest to 450 nm when the above position was that of bottom [nm] | — | — | 425 | 380 | 394 | 531 |
| Measurements and evaluations | Water vapor transmission rate [g/m$^2$ · day] | 0.1 | 0.3 | 12 | 0.5 | 0.1 | 0.1 |
|  | Total light transmittance [%] | 89.7 | 89.8 | 89.3 | 90.1 | 89.4 | 89.4 |
|  | b* value | 0.6 | −0.1 | 0.4 | 1.6 | 0.8 | 1.5 |
|  | Δx | −0.02 | −0.012 | −0.166 | −0.02 | −0.010 | 0.305 |
|  | Δy | −0.042 | −0.021 | −0.2929 | −0.040 | −0.019 | −0.016 |

From the results in Table 1, it can be confirmed that the barrier films of the Examples can suppress a change in color when applied to a wavelength conversion sheet. In particular, it can be confirmed that the barrier films of Examples 1, 5 to 7, 9, and 10 having a peak at 450 nm or more and 457 nm or less can extremely suppress a change in color. Similarly, it can be confirmed that the barrier film of Example 8 having a bottom at 443 nm or more and 450 nm or less can extremely suppress a change in color.

On the other hand, from the results in Table 2, it can be confirmed that the barrier films of the Comparative Examples cannot suppress a change in color when applied to a wavelength conversion sheet. In the barrier films of Comparative Examples 1, 5, and 6, the position of the peak or the bottom was greatly deviated from 450 nm, and thus the barrier films were unable to suppress a change in color. In the barrier films of Comparative Examples 2 to 4, the position of the peak or the bottom was in the vicinity of 450 nm, but the initial water vapor barrier property was inferior, and thus the barrier films were unable to suppress a change in color. It is considered that the reason why the barrier film of Comparative Example 2 was inferior in the initial water vapor barrier property is that the thickness of the organic coating layers was small. Further, it is considered that the reason why the barrier film of Comparative Example 3 was inferior in the initial water vapor barrier property is that the thickness of the organic coating layers was too large and a crack was generated in the inorganic oxide layers by the stress generated in the process of forming the organic coating layers. It is considered that the reason why the barrier film of Comparative Example 4 was inferior in the initial barrier property is that only one inorganic oxide layer was provided and the thickness of the inorganic oxide layer was small.

REFERENCE SIGNS LIST

10: Light-transmitting base material
21: Inorganic oxide layer A
22: Inorganic oxide layer C
31: Organic coating layer B
32: Organic coating layer D 40: Primer layer
50: Quantum dot-containing layer
100: Barrier film
100a: Barrier film
100b: Barrier film
200: Wavelength conversion sheet
210: Light source
220: Optical plate
221: Light guide plate
222: Diffusing plate
230: Reflector
240: Prism sheet
300: Backlight
301: Edge-lit type backlight
302: Direct-lit type backlight

The invention claimed is:

1. A barrier film for a wavelength conversion sheet that is a barrier film comprising at least one inorganic oxide layer and at least one organic coating layer on one surface of a light-transmitting base material, wherein
   a total thickness of the inorganic oxide layers and the organic coating layers is 150 nm or more and 800 nm or less,
   a value of a water vapor transmission rate according to JIS K7129-2:2019 is 0.20 g/m$^2$·day or less, and
   when a spectral transmittance of the barrier film is measured with a surface of a side comprising the inorganic oxide layer and the organic coating layer as a light coming-in surface, the barrier film comprises a spectral transmittance bottom at which the spectral transmittance changes from decreasing to increasing, or a spectral transmittance peak at which the spectral transmittance changes from increasing to decreasing, in the range of 450 nm±7 nm.

2. The barrier film according to claim 1, wherein the barrier film comprises a spectral transmittance peak at which the spectral transmittance changes from increasing to decreasing in the range of 450 nm±7 nm.

3. The barrier film according to claim 2, wherein the barrier film comprises a spectral transmittance peak at which the spectral transmittance changes from increasing to decreasing at 450 nm or more and 457 nm or less.

4. The barrier film according to claim 1, wherein the barrier film comprises a spectral transmittance bottom at which the spectral transmittance changes from decreasing to increasing at 443 nm or more and 450 nm or less.

5. The barrier film according to claim 1, wherein the barrier film comprises an inorganic oxide layer A as the inorganic oxide layer, an organic coating layer B as the organic coating layer, an inorganic oxide layer C as the inorganic oxide layer, and an organic coating layer D as the organic coating layer in presented order on one surface of the light-transmitting base material.

6. The barrier film according to claim 5, wherein the barrier film further comprises a primer layer E on the organic coating layer D.

7. The barrier film according to claim 1, wherein the barrier film comprises an inorganic oxide layer A as the inorganic oxide layer, an organic coating layer B as the organic coating layer, an inorganic oxide layer C as the inorganic oxide layer, and a primer layer E in presented order on one surface of the light-transmitting base material.

8. A wavelength conversion sheet comprising: a quantum dot-containing layer comprising a quantum dot; and barrier films respectively laminated on both sides of the quantum dot-containing layer, wherein the barrier film is the barrier film according to claim 1 and the barrier film is laminated such that a surface of an opposite side thereof from the light-transmitting base material faces a side of the quantum dot-containing layer.

9. A backlight comprising: at least one light source that emits primary light; an optical plate that is disposed adjacent to the light source and is for light guiding or diffusion; and a wavelength conversion sheet disposed on a light going-out side of the optical plate, wherein the wavelength conversion sheet is the wavelength conversion sheet according to claim 8.

10. A liquid crystal display device comprising: a backlight; and a liquid crystal panel, wherein the backlight is the backlight according to claim 9.

11. A method for selecting a barrier film for a wavelength conversion sheet, the method comprising selecting a barrier film comprising at least one inorganic oxide layer and at least one organic coating layer on one surface of a light-transmitting base material, the barrier film satisfying the following criteria 1 through 3:
   <Criterion 1>
      a value of a water vapor transmission rate of the barrier film according to JIS K7129-2:2019 is 0.20 g/m$^2$·day or less;
   <Criterion 2>
      when a spectral transmittance of the barrier film is measured with a surface of a side comprising the inorganic oxide layer and the organic coating layer as a light coming-in surface, the spectral transmittance measured comprises a spectral transmittance bottom at which the spectral transmittance changes from decreasing to increasing, or a spectral transmittance peak at which the spectral transmittance changes from increasing to decreasing, in the range of 450 nm±7 nm
   <Criterion 3>
      a total thickness of the inorganic oxide layers and the organic coating layers is 150 nm or more and 800 nm or less.

* * * * *